(12) United States Patent
Komoriya et al.

(10) Patent No.: US 6,173,704 B1
(45) Date of Patent: Jan. 16, 2001

(54) EXHAUST GAS PURIFICATION SYSTEM OF INTERNAL COMBUSTION ENGINE

(75) Inventors: Isao Komoriya; Ken Ogawa, both of Wako (JP)

(73) Assignee: Honda Giken Kogyo Kabushiki Kaisha, Tokyo (JP)

(*) Notice: Under 35 U.S.C. 154(b), the term of this patent shall be extended for 0 days.

(21) Appl. No.: 09/133,315

(22) Filed: Aug. 13, 1998

(30) Foreign Application Priority Data

Aug. 14, 1997 (JP) .................................................. 9-233328

(51) Int. Cl.$^7$ ..................................................... F02B 41/00
(52) U.S. Cl. ....................................... 123/698; 123/568.21
(58) Field of Search .............................. 123/698, 568.21, 123/478

(56) References Cited

U.S. PATENT DOCUMENTS

| | | |
|---|---|---|
| 5,326,735 | 7/1994 | Itoh et al. . |
| 5,357,749 | 10/1994 | Ohsuga et al. . |
| 5,402,641 | 4/1995 | Katoh et al. . |
| 5,487,268 | 1/1996 | Itoh et al. . |
| 5,571,763 | 11/1996 | Takemoto et al. . |
| 5,613,481 * | 3/1997 | Kitagawa et al. ................... 123/698 |
| 5,768,887 * | 6/1998 | Nakamura et al. ................... 123/698 |
| 5,848,580 * | 12/1998 | Mashiki ................................ 123/698 |
| 5,950,595 * | 9/1999 | Yoshioka et al. ................. 123/568.21 |
| 5,988,151 * | 11/1999 | Schnieder ............................ 123/698 |

FOREIGN PATENT DOCUMENTS

| | | |
|---|---|---|
| 0 496 526 | 7/1992 | (EP) . |
| 0 503 882 | 9/1992 | (EP) . |
| 8-309186 | 11/1996 | (JP) . |

* cited by examiner

*Primary Examiner*—John Kwon
(74) *Attorney, Agent, or Firm*—Arent Fox Kintner Plotkin & Kahn PLLC

(57) ABSTRACT

A system for purifying exhaust gas of an internal combustion engine having a catalyst in an exhaust system of the engine, said catalyst reducing nitrogen oxide when exhaust gas generated by the engine is in an oxidizing state. An EGR mechanism is provided for recirculating a part of the exhaust gas to an intake system of the engine, and is controlled such that a ratio of unsaturated and/or aromatic hydrocarbon concentration to nitrogen oxide concentration in the exhaust gas is at or above a predetermined value. The EGR mechanism is further controlled such that oxygen concentration in the exhaust gas is below a prescribed value. An injection timing mechanism is controlled for the same purpose. With this arrangement, the system improves the NOx purification rate of the catalyst.

28 Claims, 18 Drawing Sheets

RELATIONSHIP BETWEEN INJECTION TERMINATION TIMING AND ηNOx

EXHAUST GAS PURIFICATION SYSTEM OF INTERNAL COMBUSTION ENGINE

BACKGROUND OF THE INVENTION

1. Field of the Invention

This invention relates to an exhaust gas purification system of an internal combustion engine, particularly to an exhaust gas purification system of an internal combustion engine that uses a selective-reduction type NOx reduction catalyst to reduce NOx (oxides of nitrogen) constituents in an exhaust gas in an oxidizing state by use of HCs (hydrocarbons) as a reducing agent.

2. Description of the Related Art

U.S. Pat. No. 5,357,749, for example, teaches a system for purifying exhaust gas by using a catalyst that decomposes NOx (oxides of nitrogen) constituents in oxidizing environment (lean air/fuel ratio), particularly a selective-reduction type NOx reduction catalyst that reduces NOx constituents in an oxidizing environment, and regulating the exhaust constituent concentrations such that the NOx constituent concentration and HC constituent concentration in the exhaust gas are regulated to a prescribed ratio.

This conventional system utilizes the fact that the NOx reduction (decomposition) catalyst optimally purifies both NOx and HC at a particular NOx—HC ratio, namely, at a particular ratio of the NOx and HC concentrations. Specifically, the system purifies NOx in an oxidizing atmosphere by detecting the NOx and HC concentrations of the exhaust and controlling the detected concentrations to prescribed values by regulating the air/fuel ratio, amount of secondary air, ignition timing and/or other parameters.

One of the known decomposition catalysts of this type is the selective-reduction type NOx reduction catalyst taught by, for example, U.S. Pat. No. 5,326,735 and U.S. Pat. No. 5,487,268, which comprises iridium and an alkaline earth metal carried together on a substrate (monolith) comprised of at least one material or substance selected from the group comprised of metallic carbides and metallic nitrides. Another is the catalyst taught by U.S. Pat. No. 5,402,641, which is an NOx-absorbent comprising platinum (Pt) or like noble metal borne on a substrate (monolith) and referred as an absorbent catalyst.

Recently, however, the move toward leaner air/fuel ratio controls, as seen in lean-burn engines and direct injection engines (in which fuel is directly injected in the engine cylinders), has created a need for higher NOx constituent purification performance in an oxidizing environment (i.e., under leaner air/fuel ratio).

BRIEF SUMMARY OF THE INVENTION

An object of this invention is therefore to provide an exhaust gas purification system of an internal combustion engine of the aforesaid type utilizing a selective-reduction type NOx (nitrogen oxide) reduction catalyst that offers enhanced NOx constituent purification performance in the exhaust gas in an oxidizing state.

To achieve this object the present invention provides a system for purifying exhaust gas of an internal combustion engine having a catalyst in an exhaust system of the engine, said catalyst reducing nitrogen oxide when exhaust gas generated by the engine is in an oxidizing state, including an exhaust gas constituent concentration control means for controlling exhaust gas constituent concentration such that a ratio of hydrocarbon to nitrogen oxide in the exhaust gas is a certain value. In the present system an EGR mechanism is provided for recirculating a part of the exhaust gas to an intake system of the engine, and an EGR control means is provided for controlling the EGR mechanism in accordance with a predetermined set of characteristics such that a ratio of unsaturated and/or aromatic hydrocarbon concentration to nitrogen oxide concentration in the exhaust gas is at or above a predetermined value.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

Embodiments of the exhaust gas purification system of an internal combustion engine according to the invention will now be explained with reference to the attached drawings.

Figure 1:
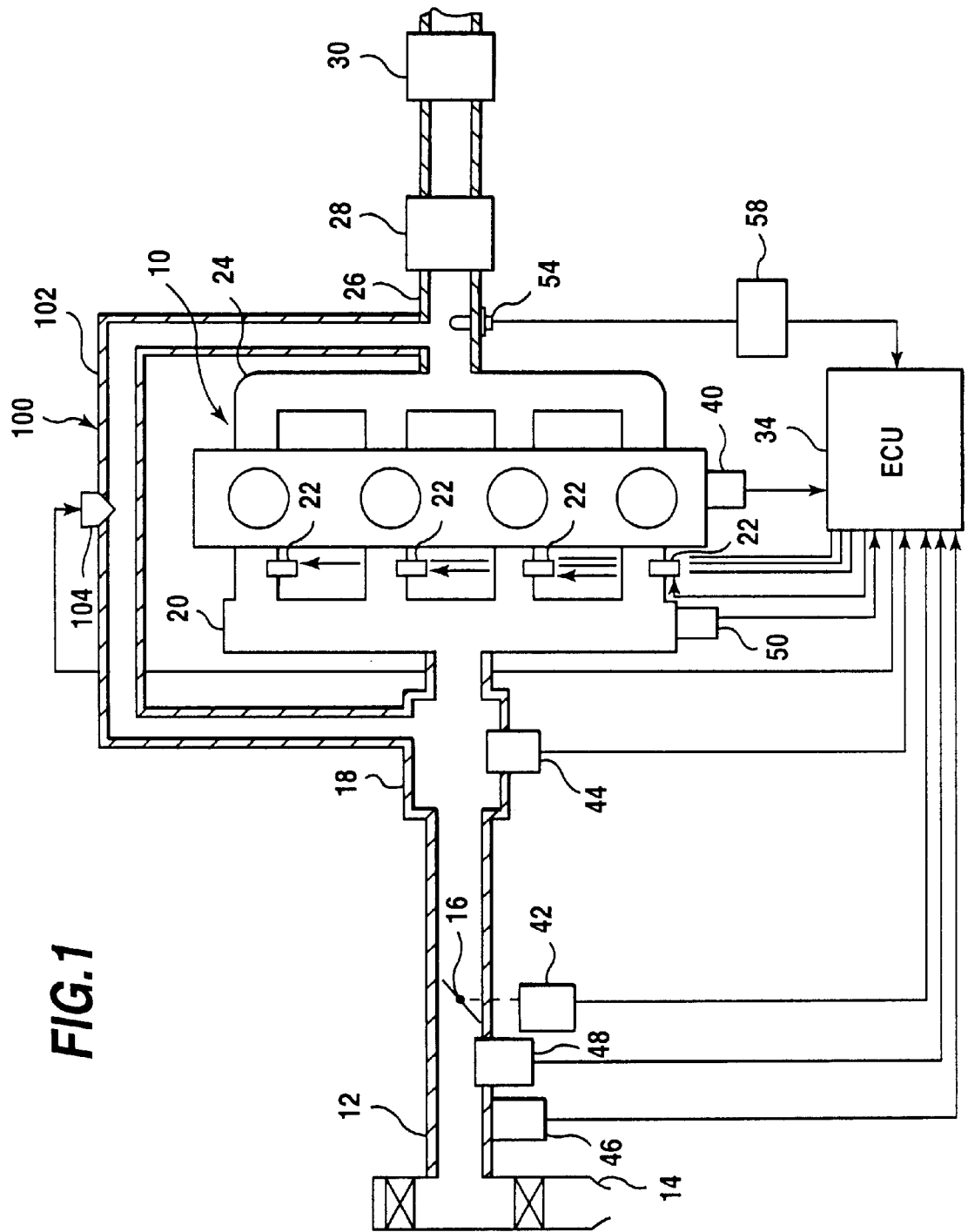
FIG. 1 is a schematic overview of the exhaust gas purification system of an internal combustion engine according to the invention.

FIG. 1 is a schematic overview of the system.

Reference numeral 10 in this figure designates an OHC in-line four-cylinder internal combustion engine. Air drawn into an air intake pipe 12 through an air cleaner 14 mounted on its far end is supplied to the first to fourth cylinders through a surge tank 18, an intake manifold 20 and intake valves (not shown), while the flow thereof is adjusted by a throttle valve 16.

A fuel injector 22 for injecting fuel is installed in the vicinity of the intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown).

The exhaust gas produced by the combustion is discharged through an exhaust valve (not shown) into an exhaust manifold 24, from where it passes through an exhaust pipe 26 to a first catalytic converter 28 and a second catalytic converter (three-way catalytic converter) 30 to be purified and then discharged to the exterior.

The first catalytic converter 28 uses a selective-reduction type NOx (nitrogen oxide) reduction catalyst of the type described earlier, namely, a catalyst comprising a ceramic or other heat resistant inorganic oxide substrate (solid, perforated, granular or other monolith) and iridium borne on the substrate (monolith) as the active material (substance). (The first catalytic converter 28 can instead be an NOx decomposition catalyst as taught by U.S. Pat. No. 5,357,749, U.S. Pat. No. 5,326,735 or U.S. Pat. No. 5,487,268, which comprise iridium and an alkaline earth metal substrate (monolith) together on a substrate (monolith) composed of at least one material (substance) selected from a group comprising metallic carbides and metallic nitrides.) The second catalytic converter 30 uses a conventional three-way catalyst.

The engine 10 is equipped with an EGR mechanism (exhaust gas recirculation mechanism) 100 which recirculates exhaust gas to the intake system.

Figure 2:
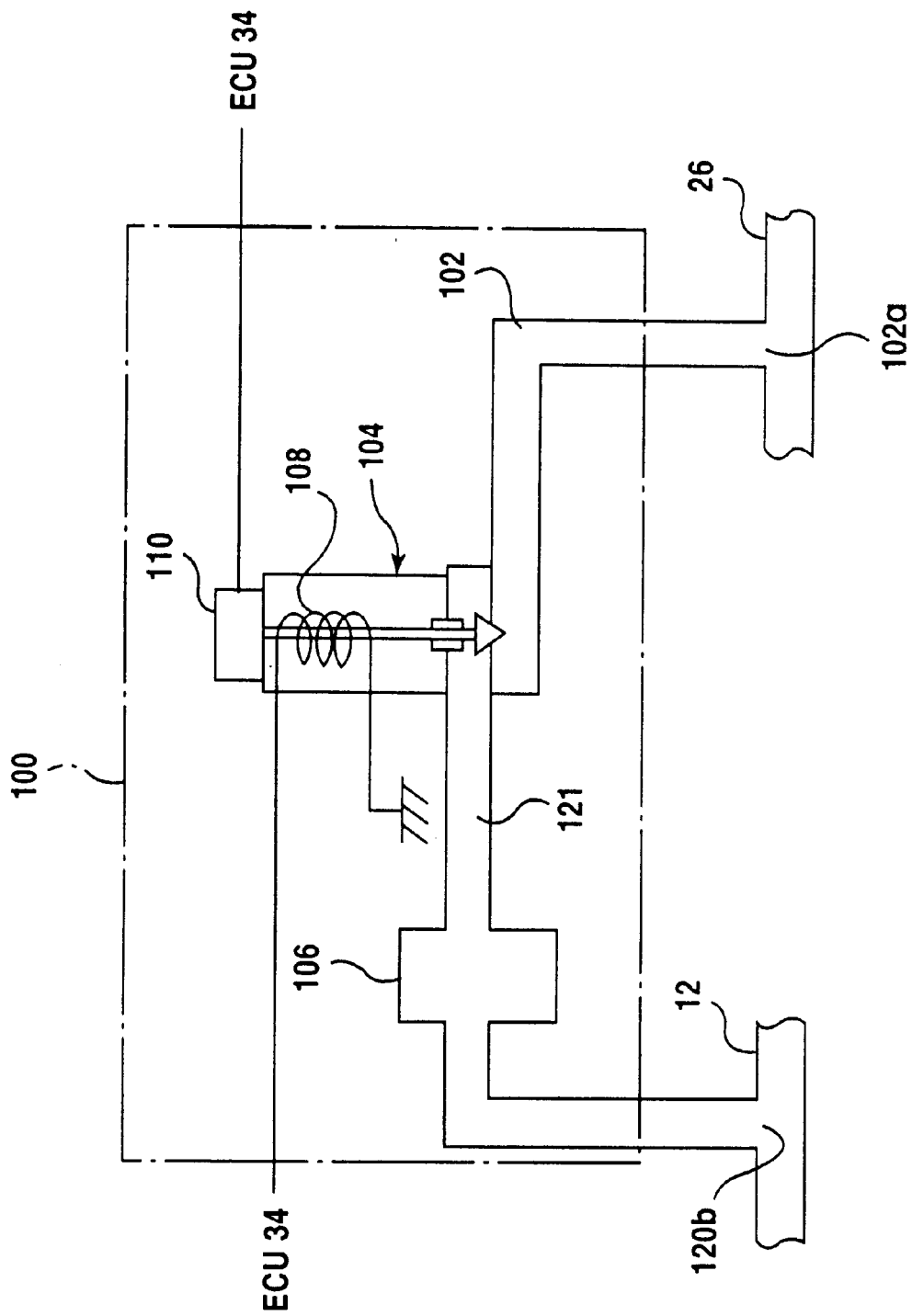
FIG. 2 is a diagram for explaining the EGR mechanism shown in FIG. 1 in detail.

As shown in FIG. 2, the EGR mechanism 100 has an EGR passage 102 whose one end 102a is connected with the exhaust pipe 26 on the upstream side of the first catalytic converter 28 (not shown in FIG. 2) and whose other end 102b is connected to the air intake pipe 12 on the downstream side of the throttle valve 16 (not shown in FIG. 2). For regulating the amount of recirculated exhaust gas, an EGR valve 104 for regulating the amount of EGR and a volume chamber 106 are provided at an intermediate portion of the EGR passage 102.

The EGR valve 104 is an electromagnetic valve having a solenoid 108 which is connected to an electronic control unit (ECU) 34 (described later). The degree of opening of the EGR valve 104 is linearly varied by an output command from the ECU 34. The EGR valve 104 is provided with a lift sensor 110 which detects the degree of opening of the EGR valve 104 and sends a corresponding signal to the ECU 34.

As shown in FIG. 1, the engine 10 is provided in its ignition distributor (not shown) with a crank angle sensor 40 for developing a cylinder discrimination signal at a prescribed crank angle of a prescribed cylinder and generating TDC (Top Dead Center) signals at prescribed crank angles, e.g., at the TDC of every cylinder, and CRK signals at subdivisions thereof, e.g., once every 15 degrees.

A throttle position sensor 42 associated with the throttle valve 16 generates a signal corresponding to the degree of opening of the throttle valve 16. A manifold absolute pressure sensor 44 provided in the air intake pipe 12 downstream of the throttle valve 16 generates a signal corresponding to the manifold absolute pressure PBA in the intake pipe.

An atmospheric pressure sensor 46 provided at an appropriate location on the engine 10 generates a signal corresponding to the atmospheric pressure PA. An intake air temperature sensor 48 provided upstream of the throttle valve 16 generates a signal corresponding to the temperature of the intake air. A coolant temperature sensor 50 provided at an appropriate location on the engine outputs a signal corresponding to the engine coolant temperature TW.

Further, an air/fuel ratio sensor 54 provided in the exhaust system at a confluence point downstream of the exhaust manifold 24 and upstream of the first catalytic converter 28 outputs a signal proportional to the oxygen concentration of the exhaust gas.

Figure 3:
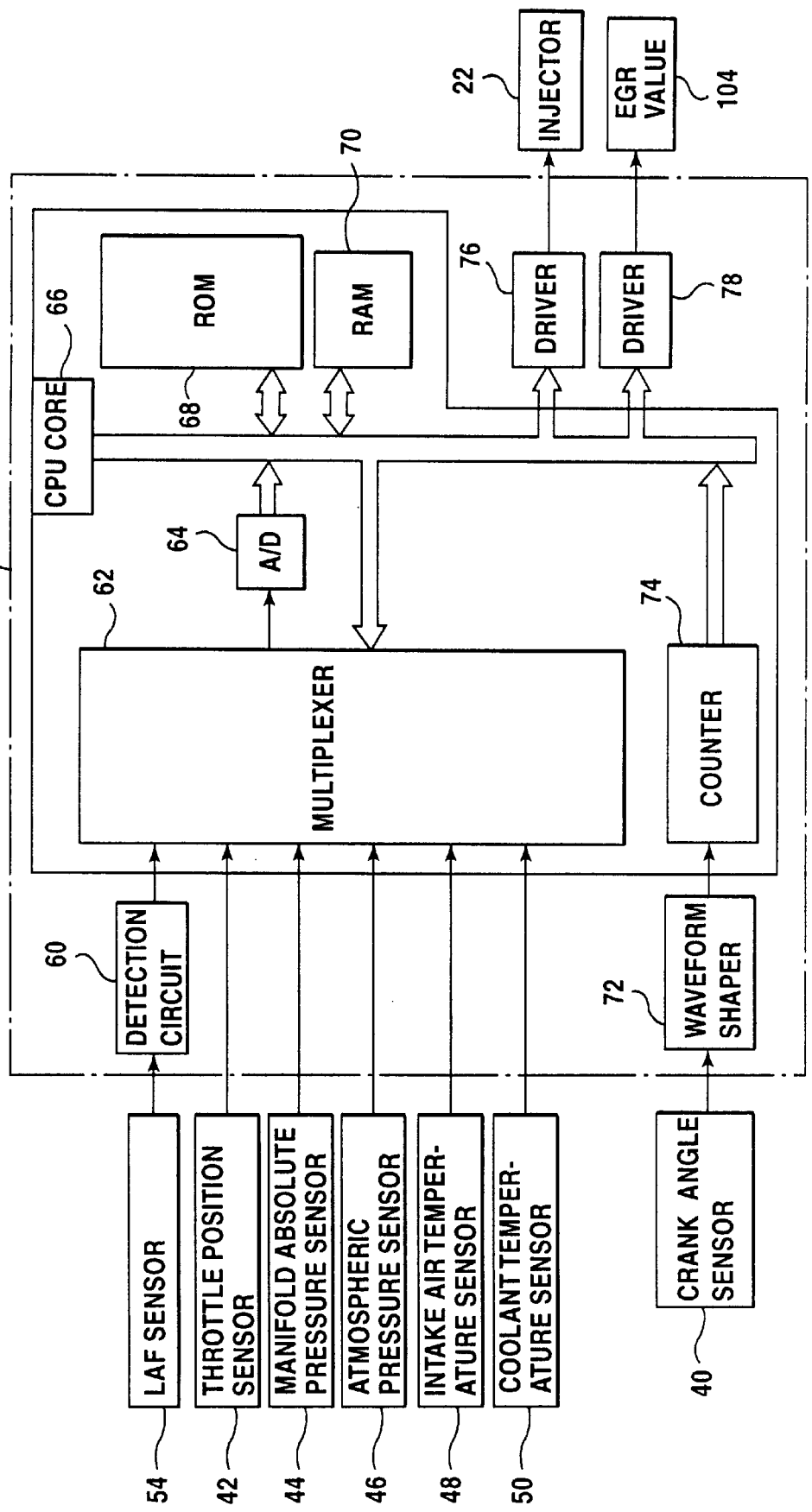
FIG. 3 is a detailed block diagram of the control unit shown in FIG. 1.

Details of the ECU 34 are shown in the block diagram of FIG. 3. The output of the air/fuel ratio sensor (shown as an LAF sensor) 54 is received by a detection circuit 60, where it is subjected to appropriate linearization processing for producing a signal proportional to the oxygen concentration of the exhaust gas.

The output of the detection circuit 60 is forwarded through a multiplexer 62 and an A/D converter 64 to a CPU (central processing unit). The CPU has a CPU core 66, a ROM (read-only memory) 68 and a RAM (random access memory) 70. Similarly, the analog outputs of the throttle opening sensor 42 etc. are input to the CPU through the multiplexer 62 and the A/D converter 64 and stored in the RAM 70.

The output of the crank angle sensor 40 is shaped by a waveform shaper 72 and the CRK signal is counted by a counter 74. The count value is input to the CPU as the engine speed NE. In the CPU, the CPU core 66 executes commands stored in the ROM 68 to compute manipulated variables in the manner described later and drives the fuel injectors 22 of the respective cylinders via a drive circuit 76 and the EGR valve 104 through a drive circuit 78. (The lift sensor 110 is not shown in FIG. 3.)

The operation of the system will now be explained.

Figure 4:
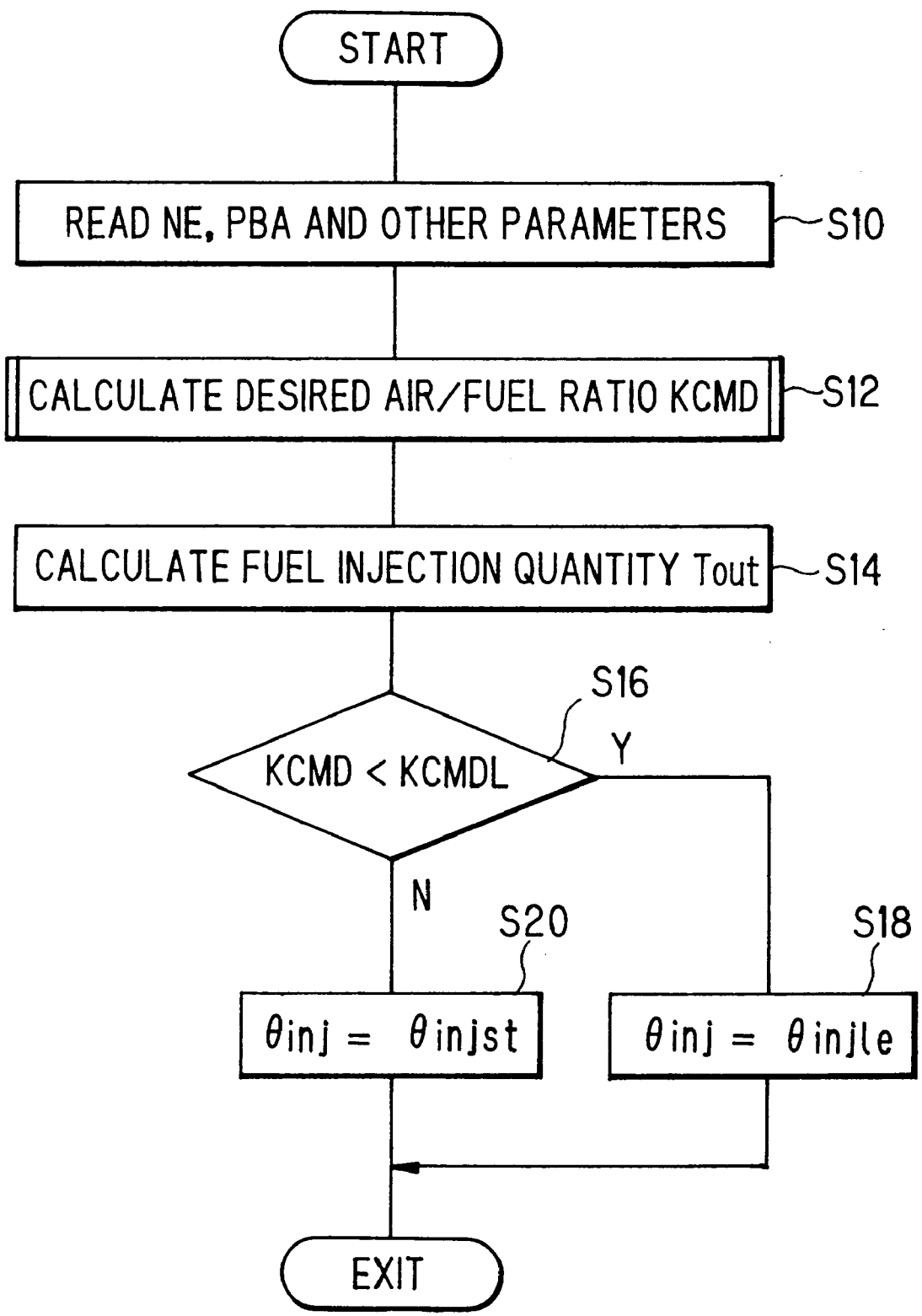
FIG. 4 is a flow chart illustrating the operation of the exhaust gas purification system of an internal combustion engine according to the invention.

FIG. 4 is a flow chart showing the operation of the system. Before going into an explanation of this figure, however, the exhaust gas purification technique of the invention will be explained.

As pointed out earlier, the first catalytic converter 28 of this system uses a selective-reduction type NOx catalyst that reduces NOx constituents in the exhaust gas in an oxidizing state using HC as the reducing agent. More specifically, it uses a selective-reduction type NOx catalyst requiring HC constituents to decompose NOx constituents and is comprised of a heat resistant inorganic oxide substrate (monolith) and iridium borne on the substrate (monolith) as the active material (substance).

As mentioned earlier, U.S. Pat. No. 5,357,749 teaches that the performance of NOx purification in the exhaust gas in an oxidizing state can be enhanced by using an NOx decomposition catalyst and regulating the ratio of the NOx and the HC concentrations in the exhaust to a desired value.

Figure 5:
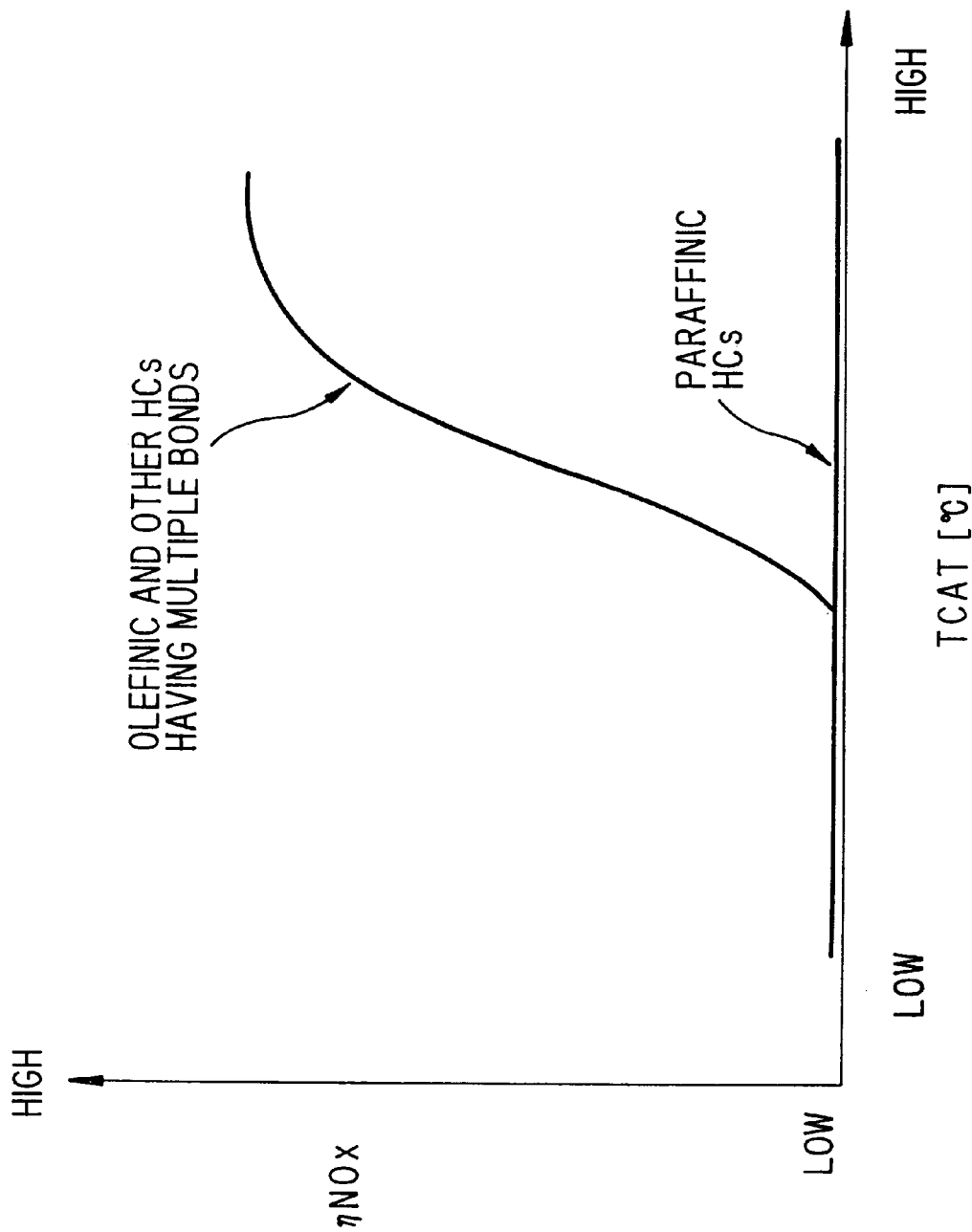
FIG. 5 is a graph for explaining the exhaust gas purification technique shown in FIG. 4, indicating the NOx purification rates of unsaturated and/or aromatic HC constituents and of other HC constituents.

However, through experiments conducted regarding selective-reduction type NOx catalysts requiring hydrocarbons to decompose NOx constituents, the inventors learned that paraffinic hydrocarbons, i.e., HC constituents that lack double, triple or other multiple carbon bonds, do not contribute to NOx purification and that olefinic HCs (unsaturated hydrocarbons) and aromatic HC (aromatic hydrocarbons) constituents that have double, triple and other multiple carbon bonds do contribute to NOX purification. This can be seen from the NOx purification characteristic curves in FIG. 5 showing how NOx purification rate ηNOx was found to vary with catalyst temperature TCAT. The property determining contribution to NOx purification is the presence of multiple carbon bonds in the HC constituent. It does not matter whether the HC is of chain compound or cyclic compound.

Thus, the inventors learned that in using a selective-reduction type NOx catalyst requiring HC constituents to decompose NOx constituents the purification rate can be effectively optimized by increasing or preventing decrease of the content ratio of olefinic hydrocarbons (unsaturated hydrocarbons) and/or aromatic hydrocarbons having multiple bonds among the HC constituents in the exhaust gas required for NOx purification. The term "olefinic hydrocarbons etc. having multiple bonds" is used hereafter in this specification and the drawings to include aromatic hydrocarbons.

Figure 6:
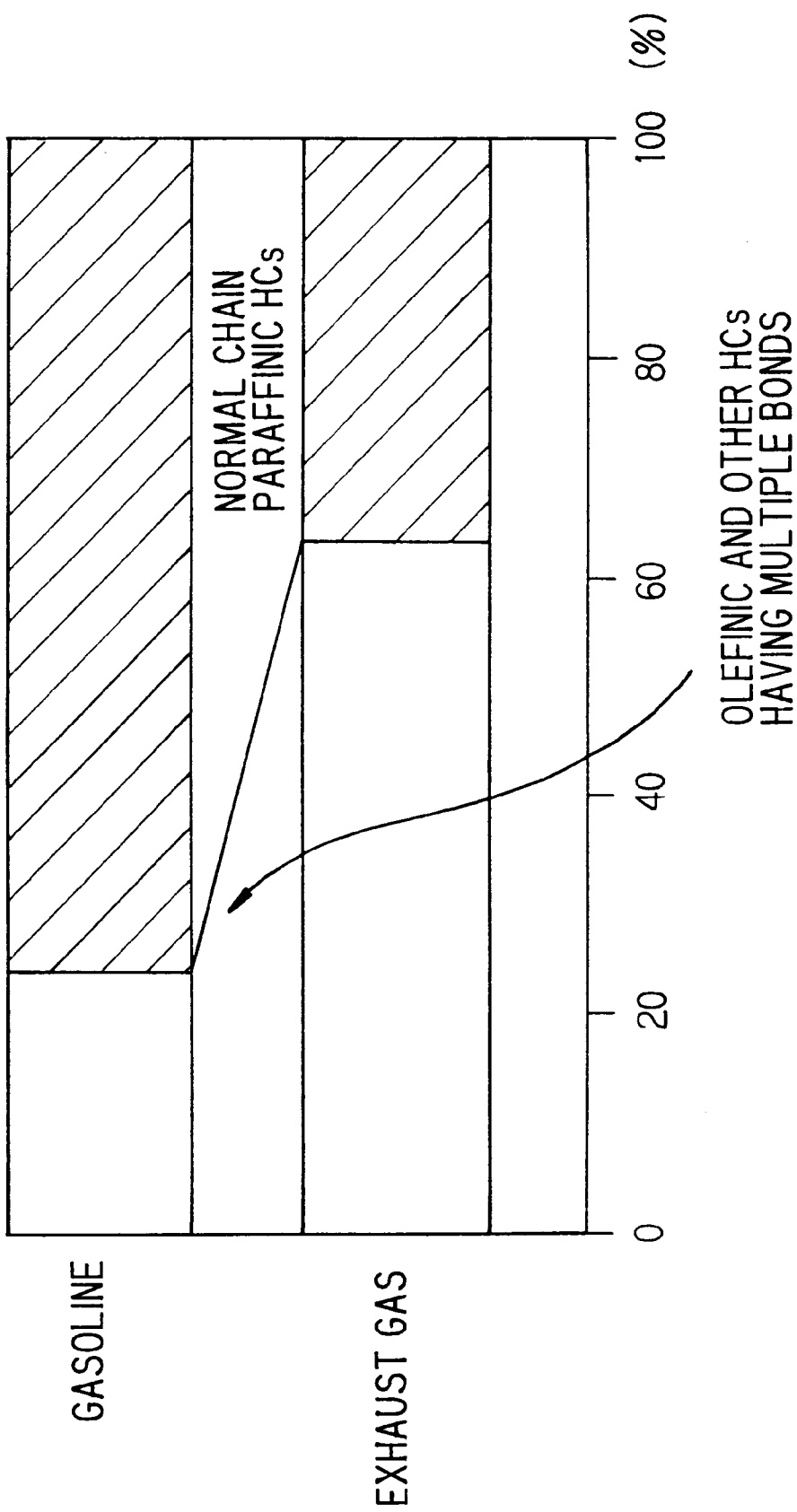
FIG. 6 is a chart showing a breakdown of the unsaturated or aromatic HC constituents and the other HC constituents present in fuel (gasoline) and exhaust gas generated therefrom.

The HC constituents of the fuel supplied to the combustion chamber (gasoline) and of the exhaust gas discharged following combustion of the fuel therein were analyzed. As shown in FIG. 6, it was found that the proportion of all HC constituents accounted for by paraffinic and other HC constituents without multiple bonds is greater in the fuel (gasoline) than in the exhaust gas. (The actual proportions differ considerably between different gasolines.)

Figure 7:
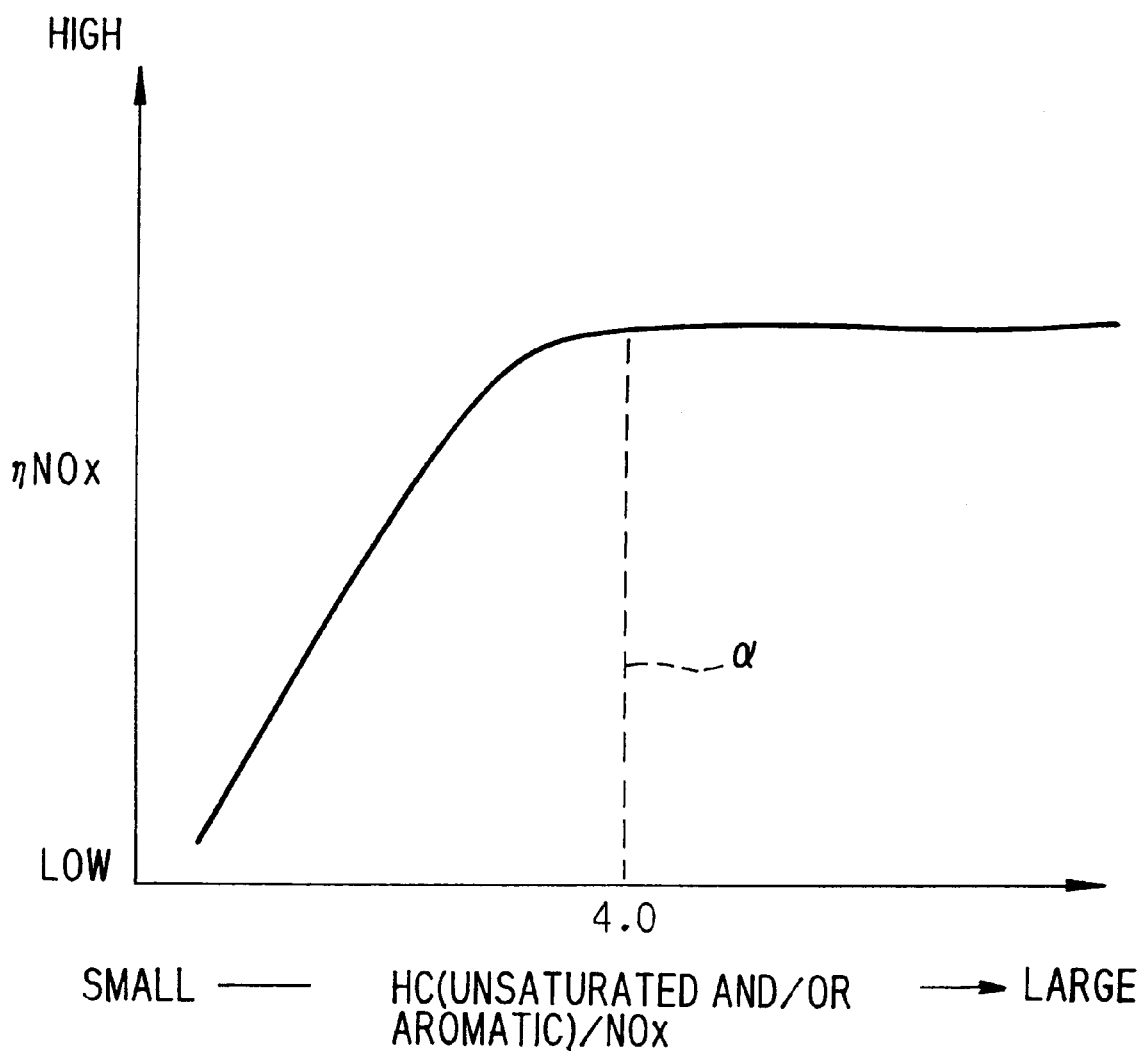
FIG. 7 is a characteristic curve showing how a purification rate varies with ratio of unsaturated and/or aromatic HC constituents to NOx.

When a large amount of unburned gas is exhausted, therefore, regulating the ratio between the HC and NOx concentrations to a prescribed value does not necessarily improve the NOx purification rate. Exhaust of a large amount of unburned gas is caused by fuel injection during the overlap period when both the intake and exhaust valves are open. Further experiments conducted by the inventors regarding use of a selective-reduction type NOx reduction catalyst revealed that, as shown in FIG. 7, the purification rate falls unless the ratio of HC to NOx, specifically the ratio of the concentration of unsaturated and/or aromatic hydrocarbons (HCs) to the concentration of NOx, rises to at least a certain value (indicated by broken line α in the drawing; namely, 4.0:1).

This invention, which was accomplished based on the foregoing knowledge, increases NOx purification rate in an oxidizing environment by a combination of using a selective-reduction type NOx catalyst requiring HC constituents to decompose NOx constituents and avoiding injection of fuel during the overlap period when both the intake and exhaust valves are open so as to increase or prevent decrease of the percentage of olefinic hydrocarbons etc. having multiple bonds present in the exhaust gas.

Based on the above, the operation of the system is explained with reference to the flow chart of FIG. 4.

The program begins in S10 in which the engine speed NE, absolute intake pipe pressure PBA and other detected operating parameters are read, and proceeds to S12 in which the desired air/fuel ratio KCMD is calculated.

Figure 8:
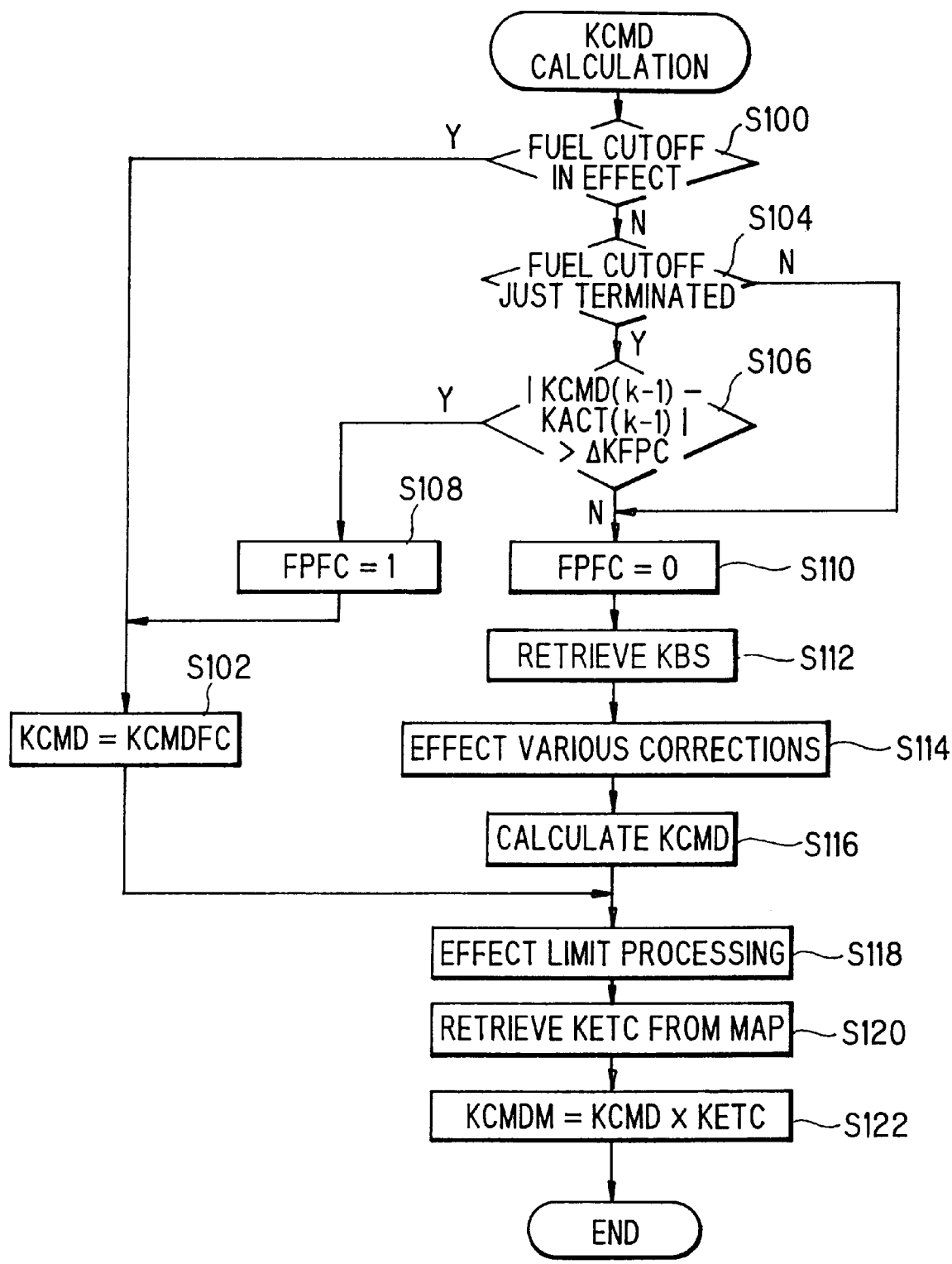
FIG. 8 is a subroutine flow chart showing the procedure for calculating a desired air/fuel ratio KCMD referred to in the flow chart of FIG. 4.

The procedure for this is shown in the subroutine flow chart of FIG. 8.

Explaining this, the program starts at S100 in which it is checked whether fuel cutoff is in effect. When the result is affirmative, the program proceeds to S102 in which the desired air/fuel ratio KCMD is set to prescribed value KCMDFC (e.g., 1.0).

When the result in S100 is negative, the program proceeds to S104 in which it is checked whether fuel cutoff was just terminated (e.g., whether 500 ms or less have passed since fuel cutoff termination). When the result is affirmative, it is checked in S106 whether the absolute value of the deviation between the value KCMD(k−1) of the desired air/fuel ratio in the preceding cycle and the value KACT(k−1) of the detected air/fuel ratio (LAF sensor output) in the preceding cycle exceeds a prescribed value KFPC (e.g., 0.14). The notation (k) indicates a sample number in the discrete system. Further, (k) is the value at current cycle and (k−1) the value in the preceding circle, more precisely (k) is the value when the FIG. 4 program is executed at the current time and (k−1) the value when it was executed in the preceeding time.

When the result in S106 is affirmative, the program proceeds to S108 in which the bit of a flag FPFC indicating that fuel cutoff was just terminated is set to 1, whereafter to S102. When the result in S106 is negative and when the result in S104 is negative, the program proceeds to S110 in which the flag bit is reset to 0.

The program then proceeds to S112 in which the detected engine speed NE and manifold absolute pressure PBA are used as address data to retrieve a base value KBS of the desired air/fuel ratio from a prescribed mapped data. Then, the program proceeds to S114 in which the retrieved base value is corrected for the coolant temperature, load and the like in accordance with the engine operating condition. The program next proceeds to S116 in which the corrected base value is multiplied by a lean correction coefficient, a deceleration correction coefficient and the like for further correction, thereby calculating the desired air/fuel ratio KCMD of the current cycle (the current cycle suffix k is omitted for simpler notation).

Next, the program proceeds to S118 in which the desired air/fuel ratio KCMD is subjected to appropriate limit processing, whereafter, to S120 in which the calculated desired air/fuel ratio KCMD is used as an address datum to retrieve a charging efficiency correction coefficient KETC from a prescribed table data. Then, the program proceeds to S122 in which the desired air/fuel ratio KCMD is multiplied by the retrieved charging efficiency correction coefficient KETC to calculate a desired air/fuel ratio correction coefficient KCMDM. (More explicitly, the desired air/fuel ratio KCMD and the desired air/fuel ratio correction coefficient KCMDM are expressed as equivalent ratios.)

Returning to the flow chart of FIG. 4, the program proceeds to S14 in which a quantity of fuel injection Tout is calculated. The quantity of fuel injection Tout is calculated in the conventional manner a:s $$Tout = Tim \times KCMDM \times KTOTAL \times KFB \times TTOTAL$$

where:
Tim: Base value retrieved from prescribed mapped data using engine speed NE and manifold absolute pressure PBA as address data;
KCMDM: Desired air/fuel ratio correction coefficient (including an EGR correction coefficient defined earlier;
KTOTAL: Product of multiplication coefficients including an EGR correction coefficient KEGRN explained later and some similar parameters;

KFB: Air/fuel ratio feedback correction term, and
TTOTAL: Sum of addition correction coefficients.

The program next proceeds to S16 in which it is checked whether the calculated desired air/fuel ratio KCMD is smaller than a prescribed value KCMDL. Since the desired air/fuel ratio KCMD is expressed as an equivalent ratio, prescribed value KCMDL is defined as a value in the lean direction, specifically as a value such as 0.8 sufficient to show that the exhaust gas is under an oxidizing atmosphere. As this value changes with the engine speed NE, the manifold absolute pressure PBA and the like, it can KCMD is less than a prescribed value in the lean direction, fuel injection is avoided during the valve overlap period to minimize discharge of unburned fuel into the exhaust gas.

This makes the percentage of the HC constituents accounted for by paraffinic HCs that do not contribute to the NOx purification rate low and the percentage accounted for by olefinic and other HC constituents having multiple bonds high. The purification rate is therefore maximized.

An experiment was conducted to determine how HC/NOx (more precisely the ratio of HC concentration to NOx concentration) and the NOx purification rate ηNOx vary under a constant lean (in air/fuel ratio) engine operating condition (desired air/fuel ratio KCMD≦0.8) when fuel injection is effected with only the fuel injection termination timing θinj varied. The results are shown in the chart of FIG. 10.

This chart shows that the value of HC/NOx when fuel injection was effected from during the valve overlap period (shown at a in the drawing) was larger than that when fuel was injected to avoid the valve overlap period (shown at b. This is because in the former case part of the injected fuel blew into the exhaust system as unburned gas before the exhaust valve closed.

The large value of HC/NOx in the former case was therefore largely due to a high percentage of paraffinic HCs in the exhaust gas. Because of this, olefinic and other HCs having multiple bonds came to account for a low percentage of the HC constituents. As a result, the NOx purification rate was lower in the former case when fuel injection was started during the valve overlap period (shown at d) than in the latter case when fuel injection was effected to avoid the valve overlap period during which both the intake and exhaust valves are open (shown at c).

Figure 10:
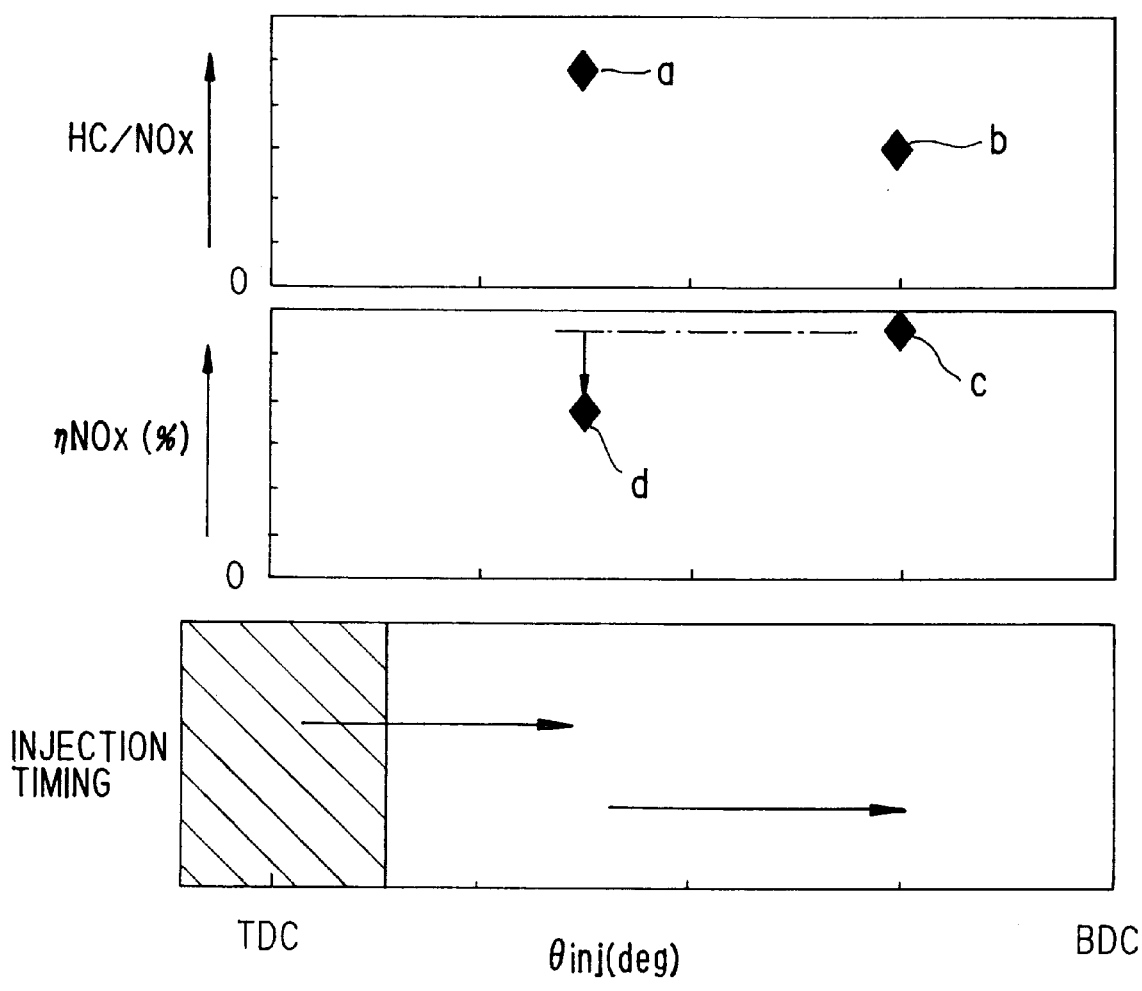
FIG. 10 is a chart showing the NOx purification rate of the system according to the invention.

It was the discovery of the principle illustrated in FIG. 10 that led to the realization of this embodiment, which is constituted to use a selective-reduction type NOx catalyst requiring HC constituents to decompose NOx constituents and to effect fuel injection so as to avoid the overlap period when both the intake and exhaust valves are open. Moreover, when the quantity of fuel injection is so large that fuel injection cannot be otherwise be retrieved from among values determined experimentally in advance, based on the detected engine speed and the like.

Figure 9:
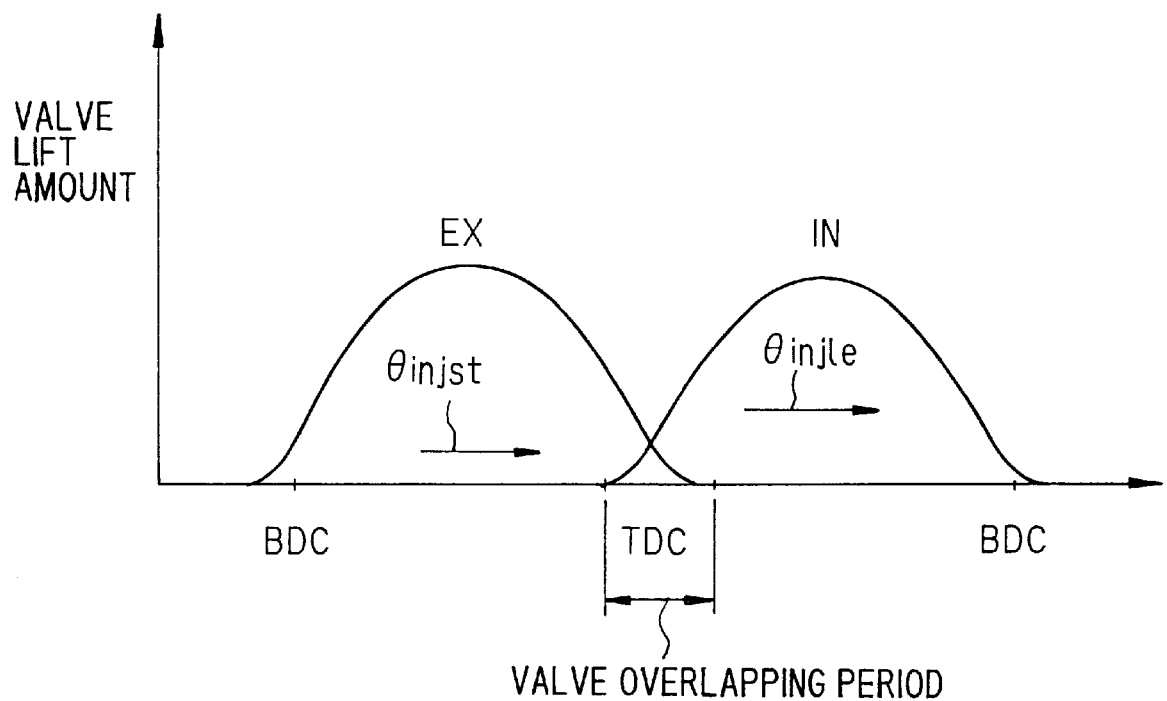
FIG. 9 is a graph showing the fuel injection timing referred to in the flow chart of FIG. 4.

When the result in S16 is affirmative, the program goes to S18 in which the fuel injection timing, more specifically, as shown in FIG. 9, the fuel injection termination timing θinj, is set to a value θinjle sufficient to avoid the valve overlap period when both the intake and exhaust valves are open. In other words, as shown in FIG. 9, the value θinjle is, for example, set to ATDC 120 degrees and fuel injection is terminated at this crank angle so as to start fuel injection after passage of the valve overlap period and complete fuel injection during the intake stroke.

When the result in S16 is negative, the program proceeds to S20 in which the fuel injection termination time point θinj is set to the normal value θinjst. As shown in FIG. 9, therefore, in this case θinjst is set to the latter part of the exhaust stroke to terminate fuel injection at, for example, BTDC 60 degrees.

When the desired air/fuel ratio KCMD is an equivalent ratio near 1.0 (the stoichiometric air/fuel ratio), purification of the HC, NOx and CO constituents in the exhaust gas is effected primarily in the second catalytic converter 30. Moreover, the quantity of fuel injection Tout determined based on the fuel injection termination timing θing set in S18 or S20 is caused to be supplied into the engine cylinder by another routine not shown in the drawings. Since this is effected by a conventional method, however, it will not be explained in detail here.

This control will be better understood by focusing on a particular cylinder. As shown in FIG. 9, when the intake valve (designated IN in the drawing) opens between BTDC 10 and 30 degrees before the exhaust valve (designated EX) closes between ATDC 10 and 30 degrees, a valve overlap period like that indicated in the drawing occurs during which both the intake and exhaust valves are open. As explained in the foregoing, however, this embodiment is configured so that when the desired air/fuel ratio completed during the intake stroke even if the fuel injection timing θinjle is set at ATDC 120 degrees, injection can be effected to avoid the overlap period by dividing the fuel injection between the exhaust stroke and the intake stroke.

Owing to the foregoing configuration, this embodiment increases the percentage of olefinic and other hydrocarbons having multiple bonds present in the exhaust gas, or at least prevents a decrease thereof, and, by this, increases the NOx purification rate in an oxidizing environment.

Figure 11:
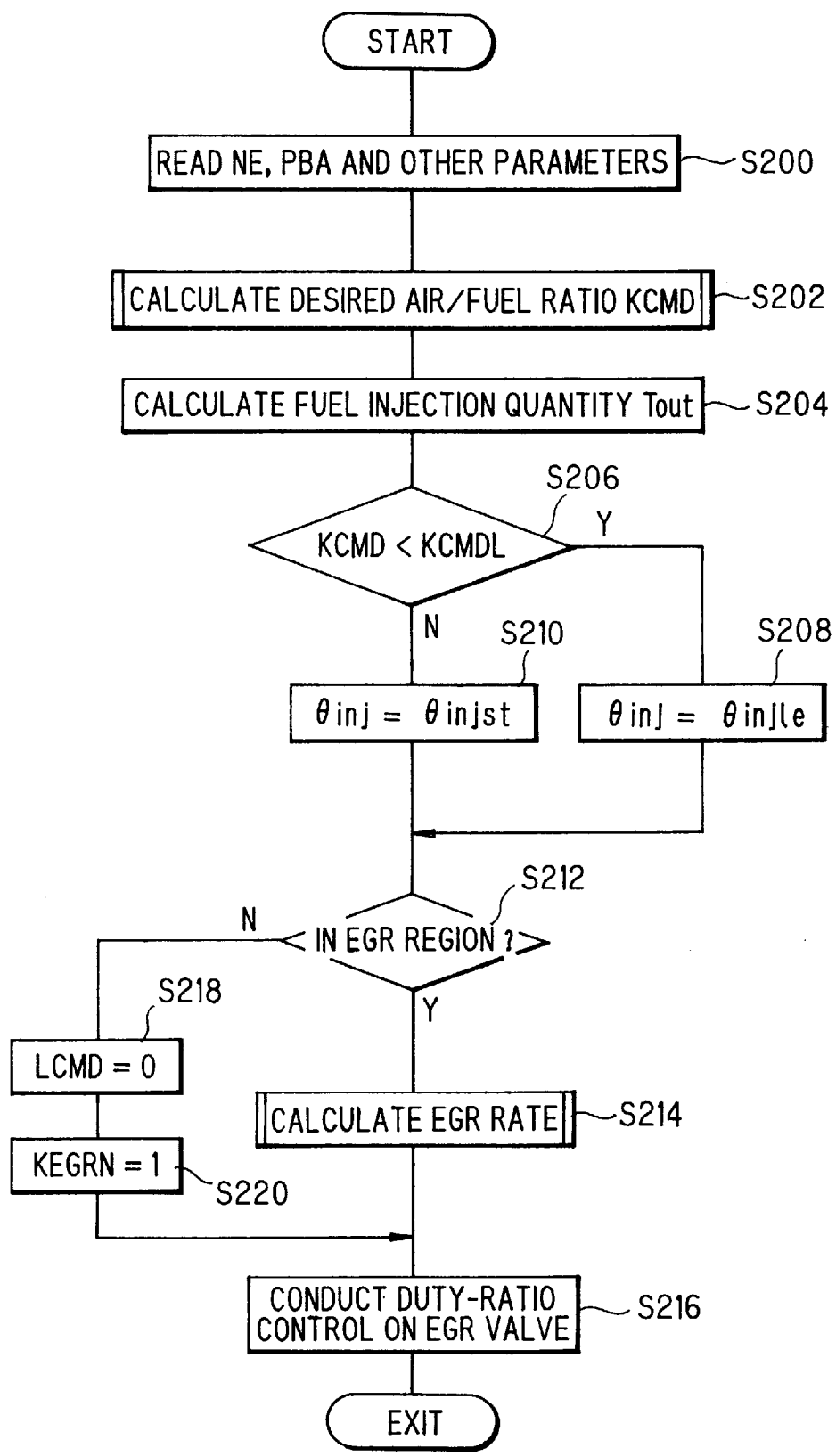
FIG. 11 is a flow chart similar to that of FIG. 4, but illustrating the operation of a system according to a second embodiment the invention.

FIG. 11 is a flow chart similar to that of FIG. 4 showing the operation of a system according to a second embodiment of the invention.

Figure 12:
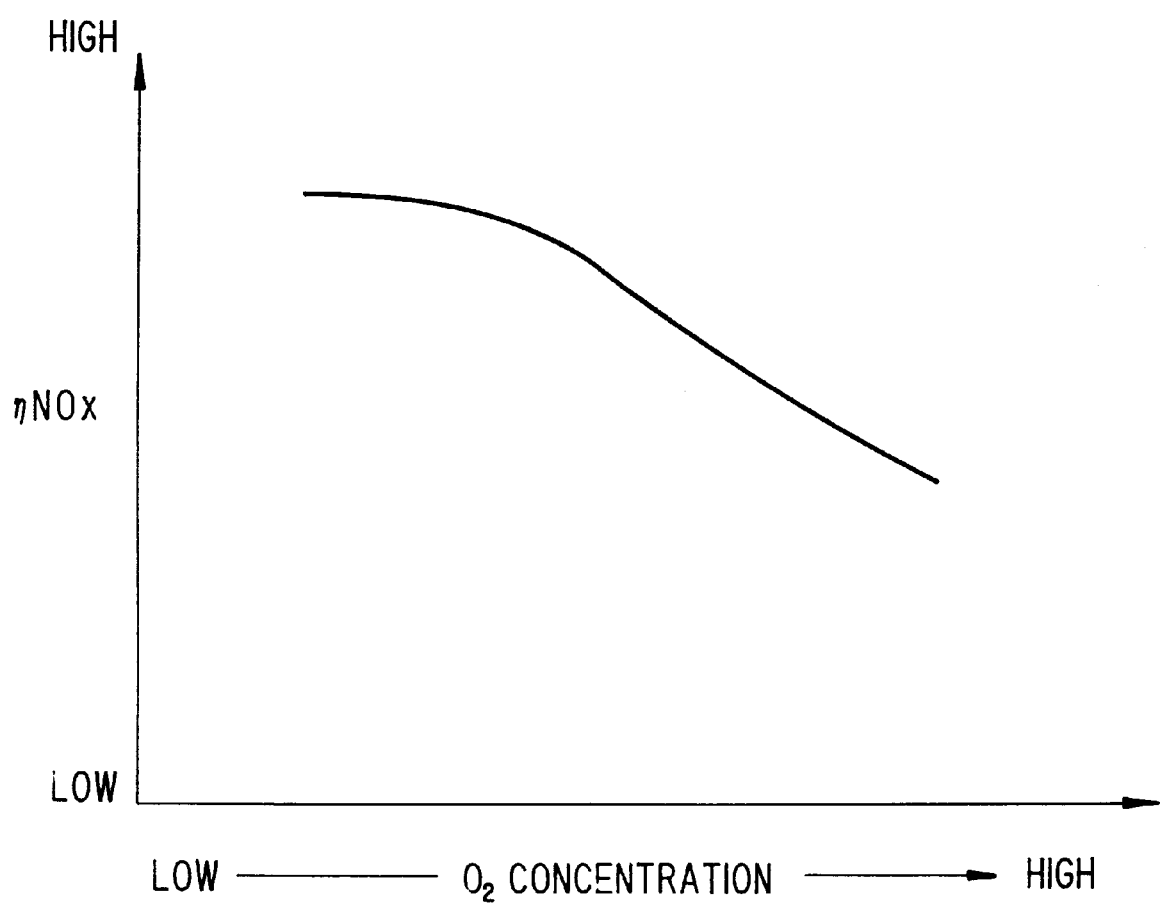
FIG. 12 is a graph showing how NOx purification rate varies with oxygen concentration in the exhaust gas.

Through further experimentation, the inventors learned that the NOx purification rate depends on the $O_2$ (oxygen) concentration in the exhaust gas, i.e., as shown in FIG. 12, that the purification rate improves with decreasing $O_2$ concentration.

Thus, the inventors' findings regarding an exhaust gas purification system using a selective-reduction type NOx catalyst requiring HC constituents to decompose NOx constituents include that a high content of olefinic and other hydrocarbons having multiple bonds in the exhaust gas is advantageous, that when a catalyst composed of a heat resistant inorganic oxide substrate (monolith) and iridium borne on the substrate (monolith) as the active material (substance) is used as the selective-reduction type NOx catalyst, then, as shown in FIG. 7, the purification rate falls unless the ratio of HCs having multiple bonds to NOx, specifically the ratio of the concentration of unsaturated and/or aromatic HCs to the concentration of NOx, is above a certain value, and that, as shown in FIG. 12, the purification rate rises as the $O_2$ concentration in the exhaust gas falls.

In other words, it was experimentally demonstrated that when an NOx decomposition catalyst of this type is used, the NOx purification rate increases when the concentration ratio of HCs (unsaturated and/or aromatic HCs) to NOx is at least a prescribed value and the $O_2$ concentration is low.

Figure 13:
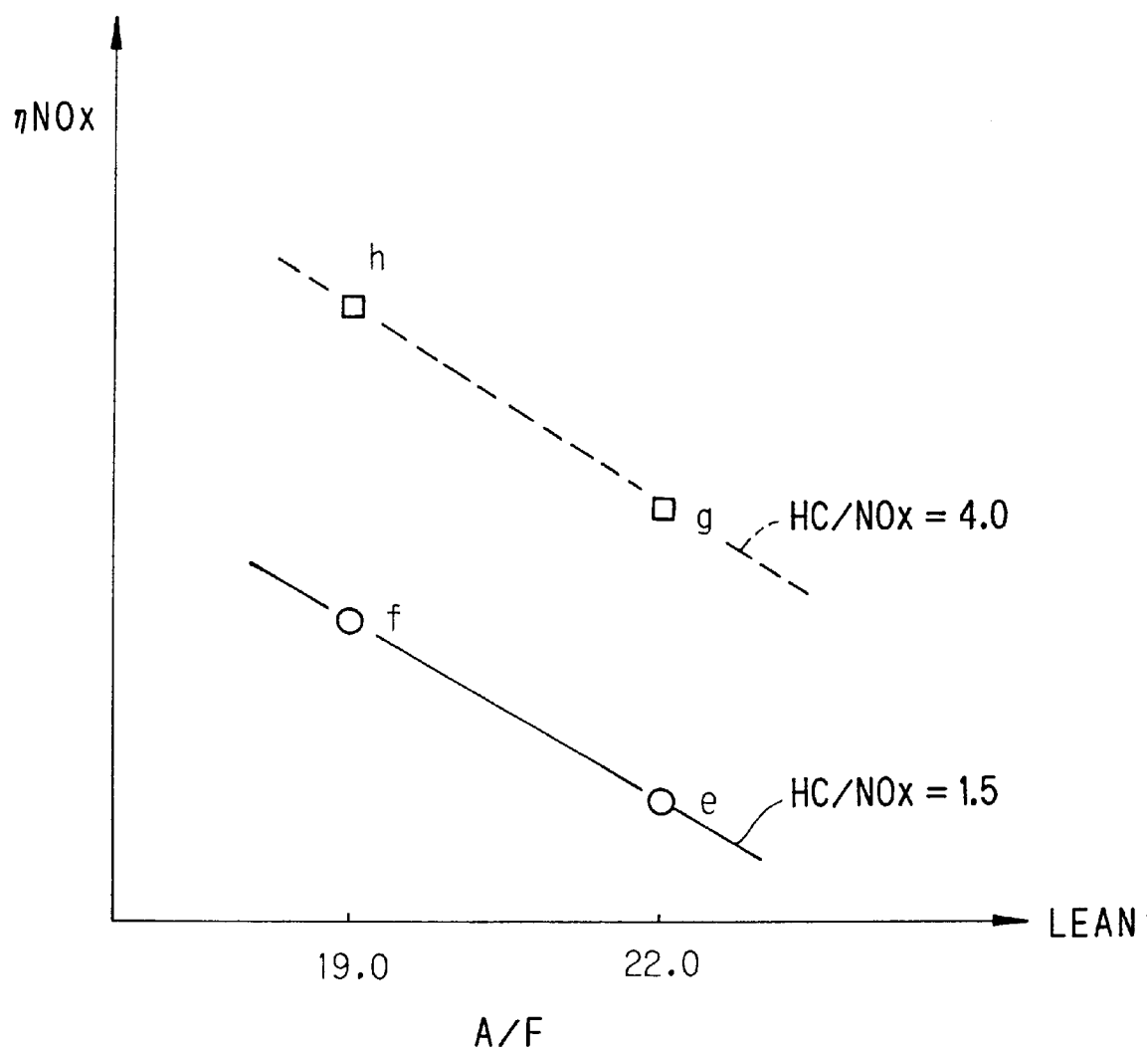
FIG. 13 is a graph showing the purification rate obtained in the system according to the second embodiment.

Further research revealed that EGR (exhaust gas recirculation) effectively improves the NOx purification rate. This is shown by the chart of FIG. 13. In this chart, e and f indicate the NOx purification rate ηNOx when the concentration ratio of HCs having multiple bonds to NOx is 1.5:1 and g and h indicate the NOx purification rate ηNOx when the concentration ratio of HCs having multiple bonds to NOx is 4.0:1.

Substantially the same engine output can be obtained at each of e, f, g and h in FIG. 13. Thus these points indicate NOx purification rates at substantially identical fuel injection quantities. The air/fuel ratio A/F is 22:1 at e and g, and the EGR rate is zero (no EGR implemented).

When the amount of intake air is regulated to move the air/fuel ratio A/F from this point in the rich direction to as far as 19:1, the NOx purification rate improves to point f. This is attributable to the lower oxygen concentration of the exhaust gas. On the other hand, when the concentration ratio of HCs having multiple bonds to NOx is raised from point e to 4.0:1 or higher by controlling the fuel injection termination timing θing, for example, the NOx purification rate improves to point g. This again indicates that the NOx purification rate depends on the oxygen concentration of the exhaust gas and on the concentration ratio of HCs having multiple bonds to NOx.

It was further learned that the NOx purification rate can be improved from point e to point g by optimally controlling the EGR rate (i.e., EGR amount). The reason for this is thought to be that EGR implementation reduces the oxygen concentration to change the air/fuel ratio from 22:1 to 19:1 and simultaneously changes the combustion state in a manner that lowers the NOx concentration of the exhaust gas and somewhat increases the unsaturated and/or aromatic HC concentration, thus boosting the ratio of HCs having multiple bonds to NOx.

At any rate, it was learned that EGR implementation lowers the NOx concentration of the exhaust gas, increases the concentration ratio of HCs having multiple bonds to NOx and further lowers the oxygen concentration, thereby markedly improving the NOx purification rate. The second embodiment is based on this knowledge.

Based on the above, explaining the flow chart of FIG. 11, the program begins in S200 and proceeds to S210 in which the fuel injection timing is set by effecting the same procedure as in the first embodiment. The program next proceeds to S212 in which it is checked whether the engine is operating in the EGR region in which EGR (exhaust gas recirculation) is effected. When the result is affirmative, the program proceeds to S214 in which the EGR rate (exhaust gas recirculation rate) is calculated.

Figure 14:
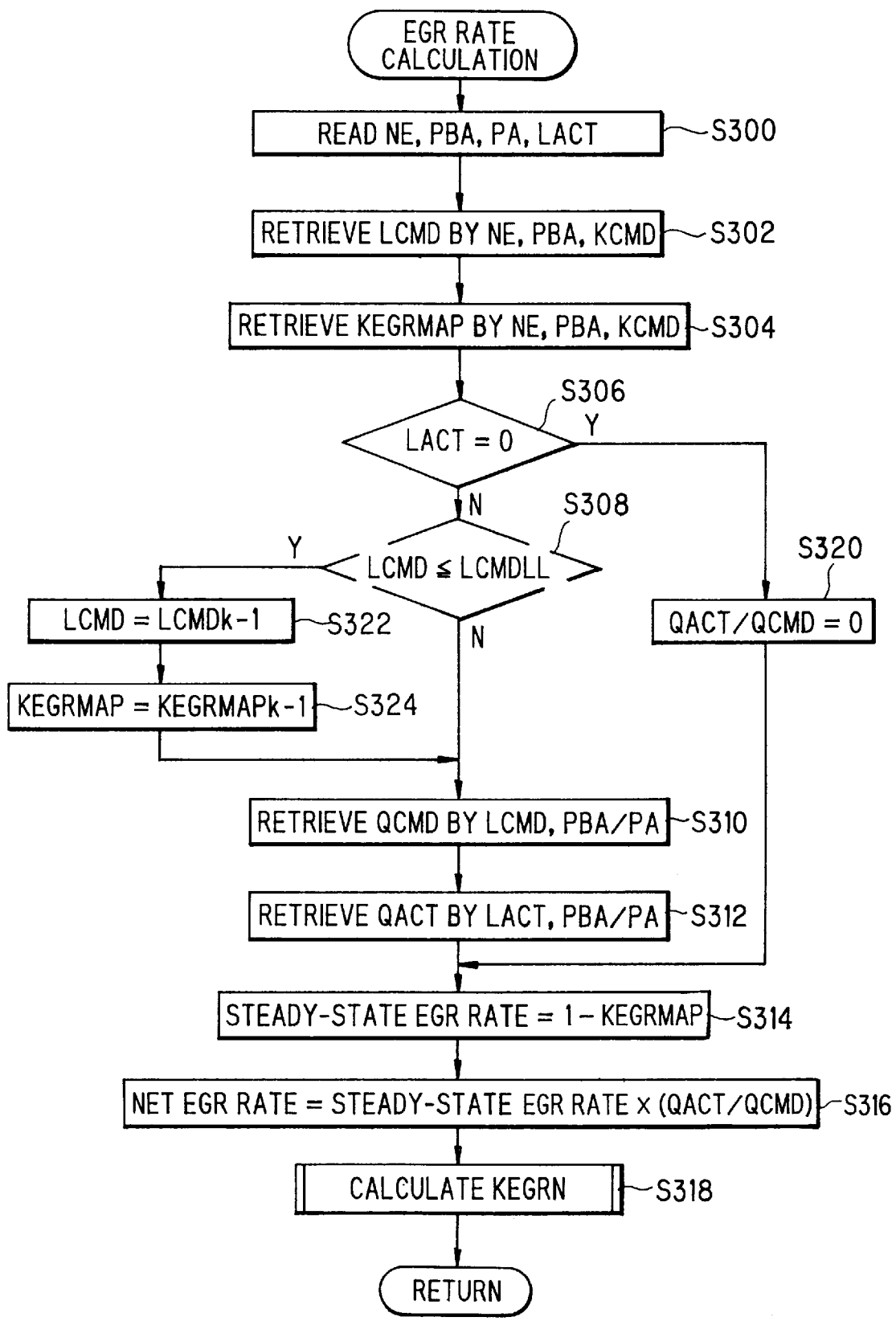
FIG. 14 is a subroutine flow chart showing the procedure for calculating EGR rate referred to in the flow chart of FIG. 11.

The procedure for this is shown in the subroutine flow chart of FIG. 14.

In the calculation of the EGR rate in this embodiment, the net rate of EGR flowing into the combustion chamber is calculated as:

Net EGR rate=(steady-state EGR rate)×(gas quantity QACT determined by actual valve lift and pressure ratio across the valve)/(gas quantity QCMD determined by valve lift command and pressure ratio across valve).

The steady-state (base) EGR rate is determined by calculating the EGR rate correction coefficient and subtracting it from 1. In other words, defining the steady-state EGR correction coefficient as KEGRMAP, it can be determined as:

Steady-state EGR rate=(1−KEGRMAP).

In this embodiment, it is assumed that the exhaust gas passing through the valve remains for a while in a space before the cylinder combustion chamber and after a pause (dead time), enters the chamber at one time. The net recirculation rate is calculated at every prescribed cycle and stored in a ring buffer in the RAM, and the value calculated for a past cycle corresponding to the dead time is deemed to be the recirculation rate of the exhaust gas actually flowing into the combustion chamber. ("EGR rate" (exhaust gas recirculation rate) is defined as the ratio by volume or weight of exhaust gas to intake air.) Since the foregoing is set out in (for example) assignee's U.S. Pat. No. 5,758,308, only a brief explanation will be given in the following.

First, in S300, the engine speed Ne, manifold absolute pressure PBA, atmospheric pressure PA, actual valve lift LACT (output of lift sensor 110) and other similar parameters are read. Next, in S302, a valve lift command value LCMD is retrieved from mapped data by use of the detected engine speed NE, the manifold absolute pressure PBA and the desired air/fuel ratio KCMD. The characteristics of the valve lift command value LCMD are predefined and the mapped as shown in FIG. 15 and retrieval is effected using the engine speed NE, manifold absolute intake pipe pressure PBA and desired air/fuel ratio KCMD as address data.

In the illustrated characteristics, KCMD2 is a value smaller in equivalent ratio (leaner in air/fuel ratio) than KCMD1, and KCMD3 is a value smaller in equivalent ratio (still leaner in air/fuel ratio) than KCMD2. The valve lift command values LCMD mapped for KCMD2 are set to be larger than those mapped for KCMD1 and those mapped for KCMD3 to be larger than those mapped for KCMD2. In other words, the valve lift command values are predetermined so as to increase the amount of exhaust gas recirculated to the intake system and supplied to the combustion chamber and thus to decrease the $O_2$ concentration of the exhaust gas as the desired air/fuel ratio KCMD becomes leaner.

Figure 16:
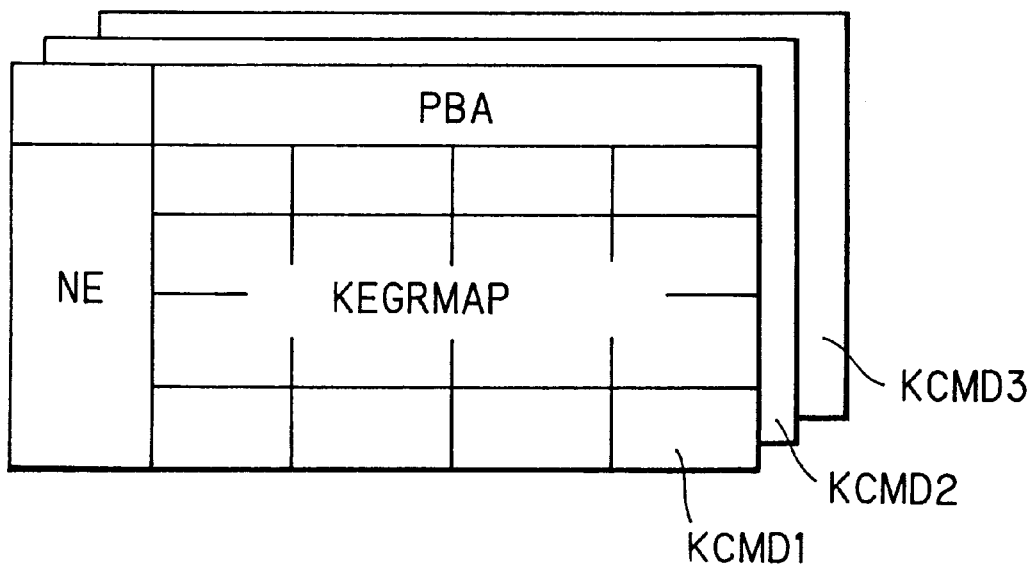
FIG. 16 is a graph showing mapped characteristics of the steady-state EGR rate correction coefficient KEGRMAP referred to in the flow chart of FIG. 14.

Next, in 304, the steady-state (basic) EGR rate correction coefficient KEGRMAP is retrieved from a mapped data whose characteristics are shown in FIG. 16 using the engine speed NE, the manifold absolute pressure PBA and the desired air/fuel ratio KCMD as address data. Experimentally determined values of the steady-state EGR rate correction coefficient KEGRMAP are mapped as shown in FIG. 16 and retrieved using the aforesaid parameters.

Figure 15:
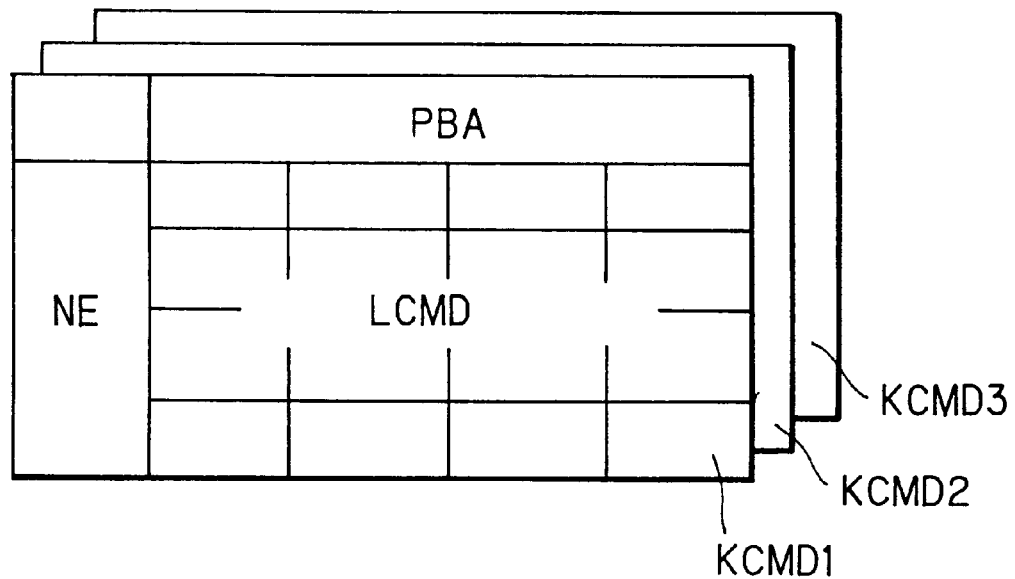
FIG. 15 is a graph showing mapped characteristics of valve lift command values referred to in the flow chart of FIG. 14.

As in the case of the characteristics shown in FIG. 15, KCMD2 is a value smaller in equivalent ratio (leaner in air/fuel ratio) than KCMD1, and KCMD3 is a value smaller in equivalent ratio (still leaner in air/fuel ratio) than KCMD2. The steady-state EGR rate correction coefficients KEGRMAP mapped for KCMD2 are set to be smaller than those mapped for KCMD1 and those mapped for KCMD3 to be smaller than those mapped for KCMD2. This is because the system responds to a leaner desired air/fuel ratio KCMD by increasing the amount exhaust gas recirculated to the intake system and supplied to combustion chamber, thereby reducing the required quantity of fuel injection.

Next, in S306, a check is made to confirm that the detected actual valve lift LACT is not zero. The retrieved lift command value LCMD is then compared with a prescribed lower limit value LCMDLL (small value) in S308. When it is found in S308 that the retrieved value is not at or below the lower limit value, the program goes to S310, in which the ratio of the manifold absolute pressure PBA to the atmospheric pressure PA (PBA/PA) is determined and this ratio and the retrieved valve lift command value LCMD are used to retrieve the gas quantity QCMD (the aforesaid gas quantity determined by the lift command value and the pressure ratio across the valve) from a prescribed map.

Next, in S312, the detected actual valve lift LACT and the same PBA/PA are used as address data to retrieve the gas quantity QACT (the aforesaid gas quantity determined by the actual lift and the pressure across the valve) from a prescribed map. Next, in S314, the steady-state EGR rate (the EGR rate during stable EGR operation) is calculated by subtracting the retrieved base EGR rate correction coefficient KEGRMAP from 1, whereafter the net EGR rate is calculated as shown in S316. The fuel injection correction coefficient KEGRN for the EGR rate is calculated in S318.

Figure 17:
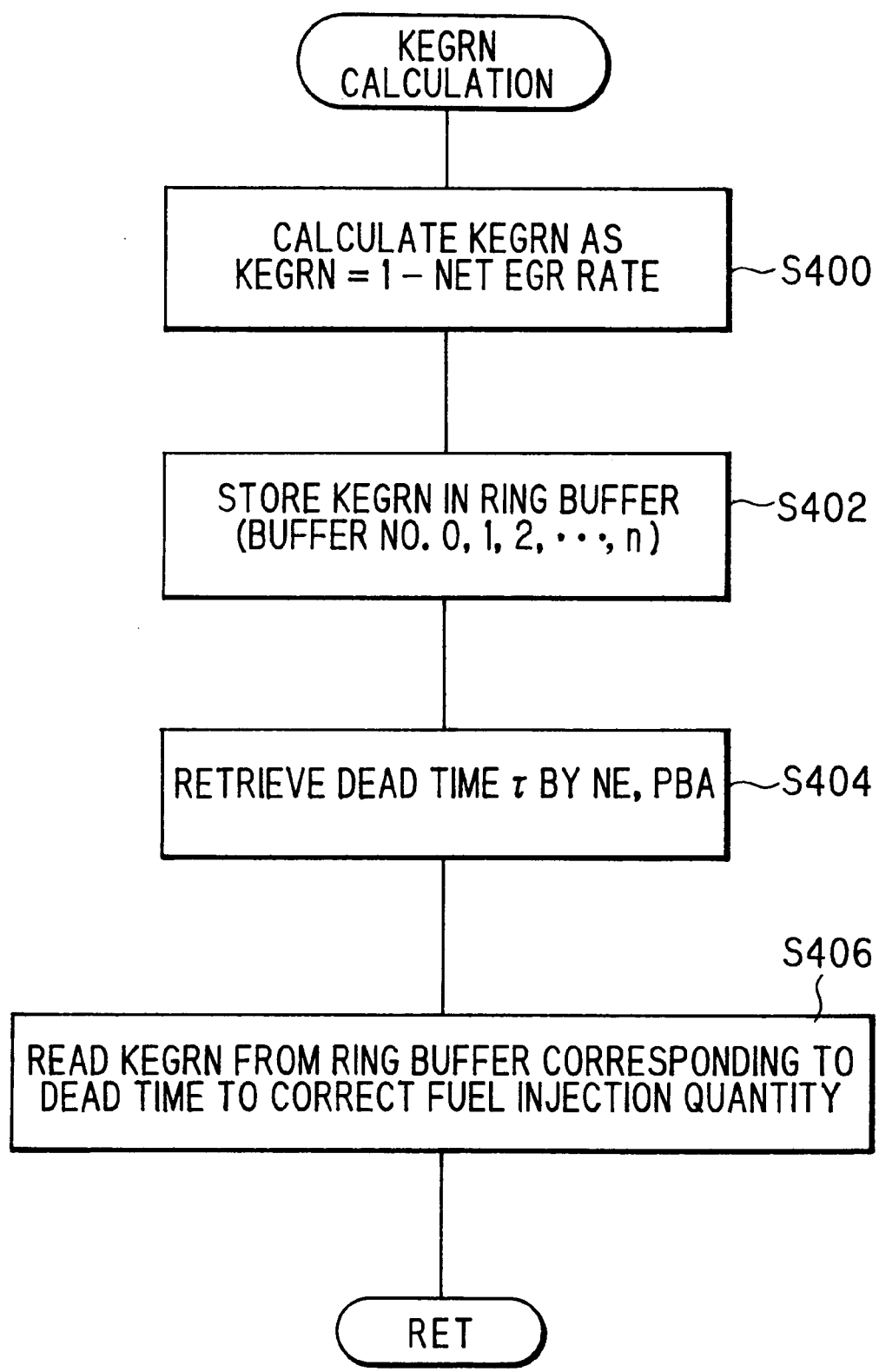
FIG. 17 is a subroutine flow chart showing the procedure for calculating the fuel injection correction coefficient KEGRN referred to in the flow chart of FIG. 14.

The procedure for this is shown in the subroutine flow chart of FIG. 17.

First, in S400 of this flow chart, the difference obtained by subtracting the net EGR rate from 1 is defined as the fuel injection correction coefficient KEGRN, whereafter the calculated fuel injection correction coefficient KEGRN is successively stored in the ring buffer. Next, in S404, the aforesaid dead time τ (expressed by ring buffer number) is retrieved from a prescribed mapped data using the detected engine speed NE and manifold absolute pressure PBA as address data. The fuel injection correction coefficient KEGRN corresponding to the retrieved dead time τ is the read in S406.

Figure 18:
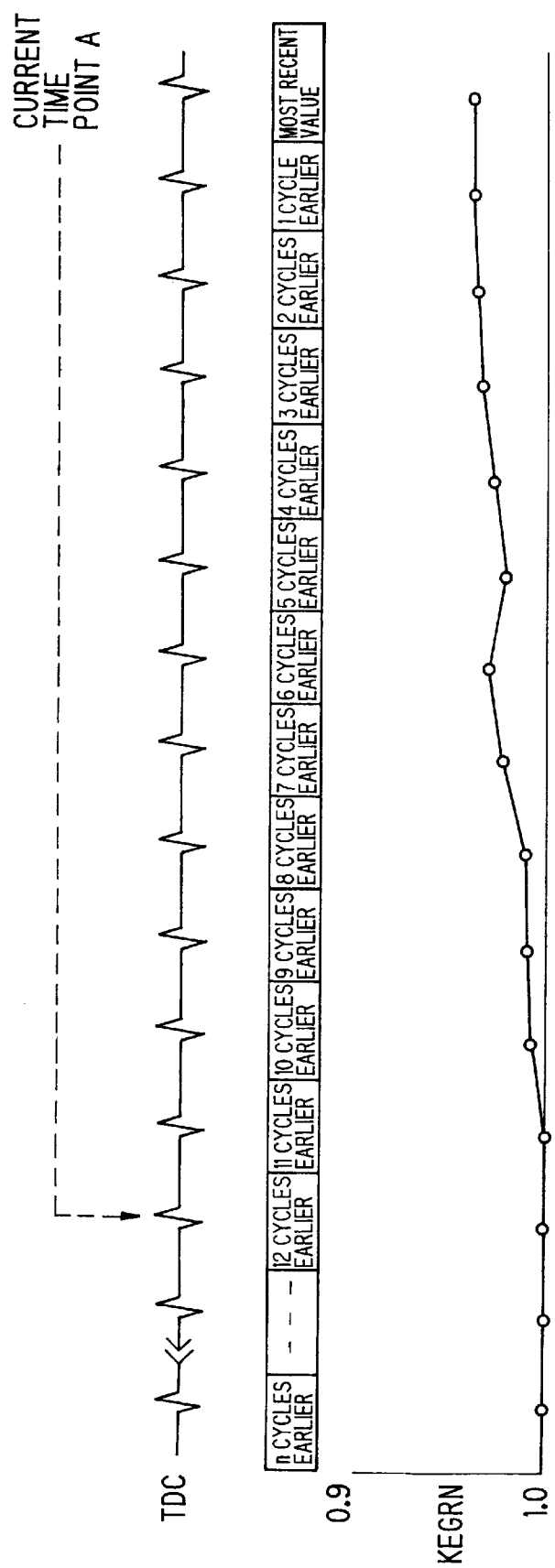
FIG. 18 is a time chart showing the determination of the fuel injection correction coefficient KEGRN using dead time referred to in the flow chart of FIG. 17.

Explaining this with reference to FIG. 18, at current time point A the value calculated 12 cycles earlier, for example, is selected and used as the fuel injection correction coefficient KEGRN of the current cycle. (As mentioned earlier, the fuel injection correction coefficient KEGRN determined is used as part of the correction coefficients KTOTAL to correct the quantity of fuel injection.)

In the flow chart of FIG. 14, when the result in S306 is affirmative, the ratio is set to zero in S320. When the result in S308 is affirmative, S322 and S324 are executed to retain the value in the preceding cycle.

Returning to the flow chart of FIG. 11, the program proceeds to S216 in which the EGR valve 104 is duty-ratio (in PWM) controlled to implement the valve lift command value LCMD retrieved in S302 of the flow chart of FIG. 14.

When the result in S206 is affirmative, KCMD3 corresponding to KCMDL (in S206) is selected and the valve lift command value LCMD is accordingly determined in the subroutine procedures shown in FIG. 14 jumped from S214. On the other hand, when the result in S206 is negative, the program proceeds to S218 in which the lift command value LCMD is determined as zero, whereafter the fuel injection correction coefficient KEGRN is also determined as 1 (one) in S220.

Owing to the foregoing configuration, the system according to the second embodiment lowers the $O_2$ concentration of the exhaust gas without increasing the amount of fuel, and increases the concentration ratio of unsaturated and/or aromatic HCs to NOx. It therefore achieves a marked improvement in the NOx purification rate.

Figure 19:
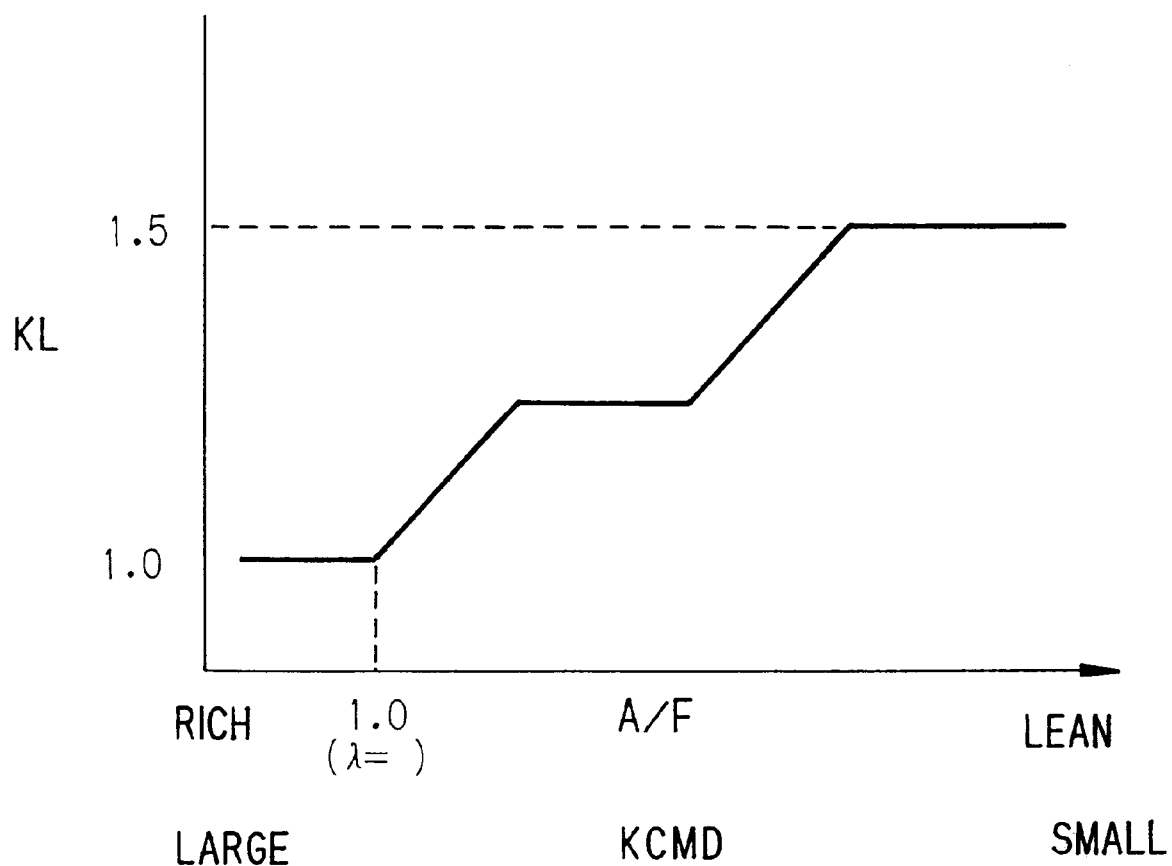
FIG. 19 is a graph illustrating the operation of a system according to a third embodiment of the invention.

FIG. 19 is a graph illustrating the operation of a system according a third embodiment of the invention.

In the third embodiment, a correction coefficient KL is determined in accordance with the desired air/fuel ratio KCMD. Specifically, only one set of the mapped characteristics of the valve lift command value LCMD shown in FIG. 15 is established, retrieval is effected using the engine speed NE and the manifold absolute pressure PBA as address data, and the retrieved value is multiplied by the correction coefficient KL to calculate the valve lift command value LCMD. Although not shown in the drawings, a correction coefficient may also be similarly established for the steady-state EGR rate correction coefficient KEGRMAP shown in FIG. 16.

In the third embodiment, like in the second embodiment, the NOx purification rate is improved by lowering the $O_2$ concentration of the exhaust gas, while the configuration is simpler since the number of mapped data are decreased.

It should be noted that in S200 to S210 of the flow chart of FIG. 11, the second and third embodiments effect processing like that in the first embodiment. Instead, however, it is possible to omit the processing of S200 to S210 and conduct only the EGR control of S212 to S216 in the second and third embodiments.

It should also be noted that all of the techniques described in the foregoing can also be applied to a direct-injection engine in which fuel is directly injected in the engine cylinder. In the direct-injection engine, fuel injection is timed to occur both in the intake stroke and the compression stroke. Unlike in the port-injection engine discussed in the embodiments, therefore, the direct-injection engine fundamentally does not involve any blowing of the injected fuel into the exhaust system during the valve timing overlap period when both the intake and exhaust valves are open.

Nonetheless, the HC constituent makeup of the exhaust gas in the direct-injection engine is also observed to differ with the fuel injection timing. Since the direct-injection engine ordinarily effects stratified combustion under low engine load, fuel injection is timed to occur during the compression stroke. When the fuel injection timing is varied within the compression stroke, however, fuel falling outside the stratified combustion range is discharged without being burned.

Under medium and high engine load, moreover, fuel injection is timed to occur during the intake stroke, resulting in premixed combustion, or during both the intake stroke and the compression stroke, resulting in a combination of premixed and stratified charging. In this case also, the combustion state is modified and the types of HC's in the exhaust gas change when the fuel injection timing is varied within the intake stroke and when the fuel injection timing during, or the apportionment of fuel injection between, the intake stroke and the compression stroke is varied.

In the direct-injection engine too, therefore, the concentration of unsaturated and/or aromatic HCs in the exhaust gas can be regulated by varying the fuel injection timing.

It should further be noted in the foregoing, the second catalytic converter 30 can be an NOx reduction (decomposition) catalytic converter with three-way catalytic capability or an oxidation catalytic converter that oxidizes hydrocarbons, carbon monoxide and the like. The only requirement of the second catalytic converter 30 is that it be able to efficiently purify hydrocarbons and carbon monoxide when the exhaust gas is other than a lean air/fuel ratio atmosphere.

It should further be noted that the EGR mechanism is not limited to the electrically-powered exhaust gas recirculation valve used in the described embodiments but can instead be an exhaust gas recirculation valve utilizing a diaphragm operated by engine negative pressure.

It should further be noted that an $O_2$ sensor may be used instead of the aforesaid air/fuel ratio sensor that produces an output proportional to the oxygen concentration of the exhaust gas.

The embodiment is configured to have a system for purifying exhaust gas of an internal combustion engine having a catalyst in an exhaust system of the engine, said catalyst reducing nitrogen oxide when exhaust gas generated by the engine is in an oxidizing state, including: an exhaust gas constituent concentration control means for controlling exhaust gas constituent concentration such that a ratio of hydrocarbon to nitrogen oxide in the exhaust gas is a certain value. In the system, an EGR mechanism is provided for recirculating a part of the exhaust gas to an intake system of the engine; and an EGR control means is provided for controlling the EGR mechanism in accordance with a predetermined characteristic such that a ratio of unsaturated and/or aromatic hydrocarbon concentration to nitrogen oxide concentration in the exhaust gas is at or above a predetermined value. With the arrangement, the invention improves the NOx purification rate of the catalyst by optimizing the ratio of unsaturated and/or aromatic hydrocarbon concentration to nitrogen oxide concentration in the exhaust gas.

The embodiment is configured such that said EGR control means further controls the EGR mechanism in accordance with a predetermined characteristic such that oxygen concentration in the exhaust gas is below a prescribed value. With this, the invention further improves the NOx purification rate of the catalyst by controlling the oxygen concentration to not higher than a prescribed value, in addition to optimizing the ratio of unsaturated and/or aromatic hydrocarbon concentration to nitrogen oxide concentration in the exhaust gas.

The embodiment is configured such that it further includes an injection timing control means for controlling a timing of fuel injection to be supplied to the engine in accordance with a predetermined characteristic such that a ratio of unsaturated and/or aromatic hydrocarbon concentration to nitrogen oxide concentration in the exhaust gas is above a predetermined value. With this, the invention further improves the NOx purification rate of the catalyst by optimizing the ratio of unsaturated and/or aromatic hydrocarbon concentration to nitrogen oxide concentration in the exhaust gas.

The embodiment is configured to have a system for purifying exhaust gas of an internal combustion engine having a catalyst in an exhaust of the engine, said catalyst reducing nitrogen oxide when exhaust gas generated by the engine is in an oxidizing atmosphere, including an exhaust gas constituent concentration control means for controlling exhaust gas constituent concentration such that a ratio of hydrocarbon to nitrogen oxide in the exhaust gas is a certain value. In the system, an air/fuel ratio control means is provided for controlling an air/fuel ratio to be supplied to the engine to a value leaner than a stoichiometric air/fuel ratio, and an injection timing control means is provided for controlling a timing of fuel injection to be supplied to the engine in accordance with a predetermined characteristic such that the fuel injection is effected to avoid a period during which an intake valve and an exhaust valve is open in order that a ratio of unsaturated and/or aromatic hydrocarbon concentration to nitrogen oxide concentration in the exhaust gas is at or above a predetermined value. Having been configured in this manner, the invention further improves the NOx purification rate of the catalyst in an oxidizing atmosphere by optimizing the ratio of unsaturated and/or aromatic hydrocarbon concentration to nitrogen oxide concentration in the exhaust gas. The improvement of the NOx purification rate is particularly outstanding with a catalyst composed of iridium as the active material (substance) carried on a heat resistant inorganic oxide substrate (monolith).

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for purifying exhaust gas of an internal combustion engine having a catalyst in an exhaust system of the engine, said catalyst reducing nitrogen oxide when exhaust gas generated by the engine is in an oxidizing state, comprising:

an EGR mechanism for recirculating a part of the exhaust gas to an intake system of the engine;

an EGR control means for controlling the EGR mechanism in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value; and an injection timing control means for controlling a timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

2. A system according to claim 1, further including:

an air/fuel ratio determining means for determining a desired air/fuel ratio to be supplied to the engine, wherein said injection timing control means controls the timing of fuel injection in response to at least the desired air/fuel ratio.

3. A system according to claim 2, wherein said injection timing control means compares the desired air/fuel ratio with a predetermined air/fuel ratio and, when the desired air/fuel ratio exceeds the predetermined air/fuel ratio in a direction leaner than a stoichiometric air/fuel ratio, controls the timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

4. A system according to claim 1, wherein the catalyst is a selective-reduction type nitrogen oxide reduction catalyst.

5. A system according to claim 4, wherein the catalyst is composed of a heat resistant inorganic oxide substrate (monolith) and iridium borne on the substrate (monolith) as an active material (substance).

6. A system according to claim 5, further comprising:

an air/fuel ratio control means for controlling an air/fuel ratio to be supplied to the engine to a value leaner than a stoichiometric air/fuel ratio; and an injection timing control means for controlling a timing of fuel injection to be supplied to the engine in accordance with a predetermined characteristic such that the fuel injection is effected to avoid a period during which an intake valve and an exhaust valve are open in order that a ratio of unsaturated hydrocarbon concentration, aromatic either one of hydrocarbon concentration, and a combination of unsaturated and aromatic hydrocarbon concentration to nitrogen oxide concentration in the exhaust gas is greater than or equal to a predetermined value.

7. A system according to claim 6, wherein the catalyst is a selective-reduction type nitrogen oxide reduction catalyst.

8. A system according to claim 7, wherein the catalyst is composed of a heat resistant inorganic oxide substrate (monolith) and iridium borne on the substrate (monolith) as an active material (substance).

9. A system for purifying exhaust gas of an internal combustion engine having a catalyst in an exhaust system of the engine, said catalyst reducing nitrogen oxide when exhaust gas generated by the engine is in an oxidizing state, comprising:

an EGR mechanism for recirculating a part of the exhaust gas to an intake system of the engine;

an EGR control means for controlling the EGR mechanism in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value; and:

an injection timing control means for controlling a timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value and wherein said ERG control means further controls the EGR mechanism in accordance with a predetermined characteristic such that oxygen concentration in the exhaust gas is below a prescribed value.

10. A system according to claim 9, further including:

an air/fuel ratio determining means for determining a desired air/fuel ratio to be supplied to the engine, wherein said injection timing control means controls the timing of fuel injection in response to at least the desired air/fuel ratio.

11. A system according to claim 10, wherein said injection timing control means compares the desired air/fuel ratio with a predetermined air/fuel ratio and, when the desired air/fuel ratio exceeds the predetermined air/fuel ratio in a direction leaner than a stoichiometric air/fuel ratio, controls the timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

12. A system according to claim 11, further including:

an air/fuel ratio determining means for determining a desired air/fuel ratio to be supplied to the engine, wherein said air/fuel ratio control means controls the timing of fuel injection in response to at least the desired air/fuel ratio.

13. A system according to claim 12, wherein said air/fuel ratio control means compares the desired air/fuel ratio with a predetermined air/fuel ratio and, when the desired air/fuel ratio exceeds the predetermined air/fuel ratio in a direction leaner than a stoichiometric air/fuel ratio, controls the timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

14. A method of purifying exhaust gas of an internal combustion engine having a catalyst in an exhaust system of the engine is in an oxidizing state, comprising the steps of:

recirculating a part of the exhaust gas to an intake system of the engine; and controlling the EGR mechanism in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value and controlling a timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

15. A method according to claim 14 further including:

determining a desired air/fuel ratio to be supplied to the engine; and controlling the timing of fuel injection in response to at least the desired air/fuel ratio.

16. A method according to claim 14, comparing the desired air/fuel ratio with a predetermined air/fuel ratio and, when the desired air/fuel ratio exceeds the predetermined air/fuel ratio in a direction leaner than a stoichiometric air/fuel ratio, controlling the timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

17. A method according to claim 14, further comprising the steps of:

controlling an air/fuel ratio to be supplied to the engine to a value leaner than a stoichiometric air/fuel ratio; and controlling a timing of fuel injection to be supplied to the engine in accordance with a predetermined characteristic such that the fuel injection is effected to avoid a period during which an intake valve and an exhaust valve is open in order that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

18. A method according to claim 17, further including:

determining a desired air/fuel ratio to be supplied to the engine; and controlling the timing of fuel injection in response to at least the desired air/fuel ratio.

19. A method according to claim 18, comparing the desired air/fuel ratio with a predetermined air/fuel ratio and, when the desired air/fuel ratio exceeds the predetermined air/fuel ratio in a direction leaner than a stoichiometric air/fuel ratio, controlling the timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

20. A method according to claim 17, wherein the catalyst is a selective-reduction type nitrogen oxide reduction catalyst.

21. A method according to claim 14, wherein said method is a computer program embodied on a computer-readable medium.

22. A method according to claim 21, further comprising the steps of:

controlling an air/fuel ratio to be supplied to the engine to a value leaner than a stoichiometric air/fuel ratio; and controlling a timing of fuel injection to be supplied to the engine in accordance with a predetermined characteristic such that the fuel injection is effected to avoid a period during which an intake valve and an exhaust valve is open in order that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

23. A method of purifying exhaust gas of an internal combustion engine having a catalyst in an exhaust system of the engine is in an oxidizing state, comprising the steps of:

recirculating a part of the exhaust gas to an intake system of the engine; and controlling the EGR mechanism in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value and controlling a timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value;

wherein the ERG mechanism is controlled in accordance with a predetermined characteristic such that oxygen concentration in the exhaust gas is below a prescribed value.

24. A method according to claim 23, further including:

determining a desired air/fuel ratio to be supplied to the engine; and controlling the timing of fuel injection in response to at least the desired air/fuel ratio.

25. A method according to claim 24, comparing the desired air/fuel ratio with a predetermined air/fuel ratio and, when the desired air/fuel ratio exceeds the predetermined air/fuel ratio in a direction leaner than a stoichiometric air/fuel ratio, controlling the timing of fuel injection to be supplied to the engine in accordance with a predetermined characteristic such that a ratio of unsaturated hydrocarbon concentration, aromatic hydrocarbon concentration, or a combination of unsaturated and aromatic hydrocarbon concentration to nitrogen oxide concentration in the exhaust gas is greater than or equal to a predetermined value.

26. A method according to claim 23, wherein the catalyst is a selective-reduction type nitrogen oxide reduction catalyst.

27. A method according to claim 26, wherein the catalyst is composed of a heat resistant inorganic oxide substrate (monolith) and iridium borne on the substrate (monolith) as an active material (substance).

28. A method according to claim 27, wherein the catalyst is composed of a heat resistant inorganic oxide substrate (monolith) and iridium borne on the substrate (monolith) as an active material (substance).

* * * * *